United States Patent
Asami

(10) Patent No.: US 9,753,248 B2
(45) Date of Patent: Sep. 5, 2017

(54) IMAGING LENS AND IMAGING APPARATUS

(71) Applicant: FUJIFILM Corporation, Tokyo (JP)

(72) Inventor: Taro Asami, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/820,587

(22) Filed: Aug. 7, 2015

(65) Prior Publication Data
US 2015/0346458 A1 Dec. 3, 2015

Related U.S. Application Data

(63) Continuation of application No. PCT/JP2013/007644, filed on Dec. 26, 2013.

(30) Foreign Application Priority Data

Feb. 28, 2013 (JP) .................. 2013-038658

(51) Int. Cl.
| G02B 15/14 | (2006.01) |
|---|---|
| G02B 9/60 | (2006.01) |
| G02B 13/00 | (2006.01) |
| G02B 13/04 | (2006.01) |
| G02B 9/34 | (2006.01) |
| G02B 13/18 | (2006.01) |

(52) U.S. Cl.
CPC .............. G02B 9/60 (2013.01); G02B 9/34 (2013.01); G02B 13/0015 (2013.01); G02B 13/04 (2013.01); G02B 13/18 (2013.01)

(58) Field of Classification Search
CPC ....................................... G02B 9/60
USPC ....................................... 359/770
See application file for complete search history.

(56) References Cited

U.S. PATENT DOCUMENTS

| 4,493,536 A | 1/1985 | Kudo |
| 2010/0103537 A1 | 4/2010 | Kitahara et al. |

(Continued)

FOREIGN PATENT DOCUMENTS

| JP | 56-19020 | 2/1981 |
| JP | 57-163212 | 10/1982 |

(Continued)

OTHER PUBLICATIONS

International Search Report PCT/JP2013/007644 dated Apr. 28, 2014.
Chinese Official Action—201380073578.3—Sep. 30, 2016.
German Official Action—11 2013 006 749.8—dated May 29, 2017.

*Primary Examiner* — James Jones
(74) *Attorney, Agent, or Firm* — Young & Thompson

(57) ABSTRACT

An imaging lens consists of five lenses of, in order from the object side, a negative first lens, a positive second lens, a negative third lens, a positive fourth lens, and a positive fifth lens. The following conditional expressions are satisfied:

$$Nd3<1.75 \quad (1);$$

$$vd3<27 \quad (2);$$

$$0.0 \le (R3+R4)/(R3-R4) \quad (4); \text{ and}$$

$$f12/f<1.5 \quad (5), \text{ where}$$

Nd3 is a refractive index of the material of the third lens for d-line,
vd3 is an Abbe number of the material of the third lens for d-line,
R3 is a curvature radius of an object-side surface of the second lens,
R4 is a curvature radius of an image-side surface of the second lens, (Continued)

f12 is a combined focal length of the first lens and the second lens, and f is a focal length of an entire system.

20 Claims, 15 Drawing Sheets

(56) References Cited

U.S. PATENT DOCUMENTS

| | | |
|---|---|---|
| 2011/0169974 A1 | 7/2011 | Take et al. |
| 2012/0162769 A1 | 6/2012 | Suzuki et al. |
| 2013/0107375 A1 | 5/2013 | Huang et al. |
| 2013/0258492 A1 | 10/2013 | Asami |
| 2014/0028901 A1* | 1/2014 | Noda ................. G02B 13/0045 348/360 |

FOREIGN PATENT DOCUMENTS

| | | |
|---|---|---|
| JP | 2004-085979 | 3/2004 |
| JP | 2010-072276 | 4/2010 |
| JP | 2010-107606 | 5/2010 |
| JP | 2012-141423 | 7/2012 |
| JP | 2012-211935 | 11/2012 |
| JP | 2013-092775 | 5/2013 |
| WO | 2012086193 | 6/2012 |
| WO | 2012086194 | 6/2012 |

* cited by examiner

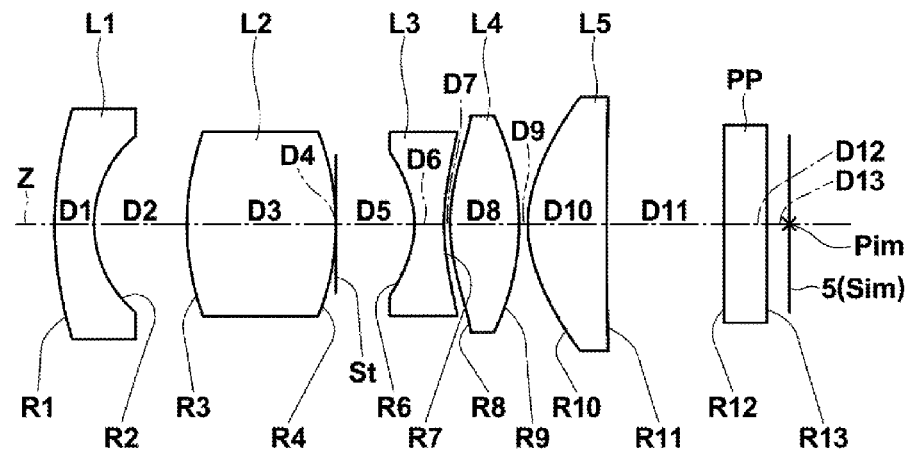
FIG.3  EXAMPLE 1
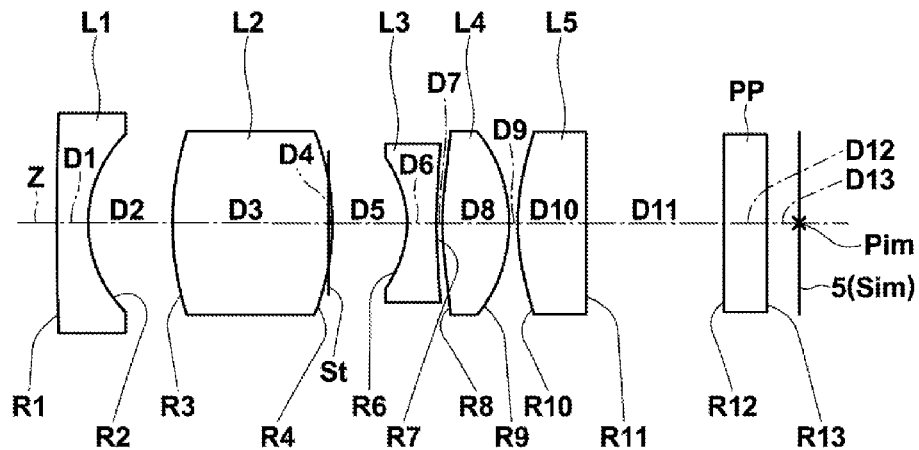
FIG.4  EXAMPLE 2

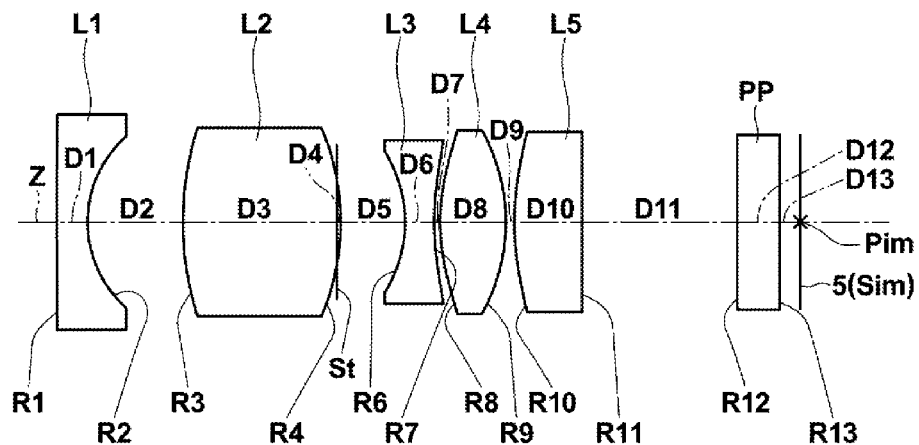
FIG.5  EXAMPLE 3
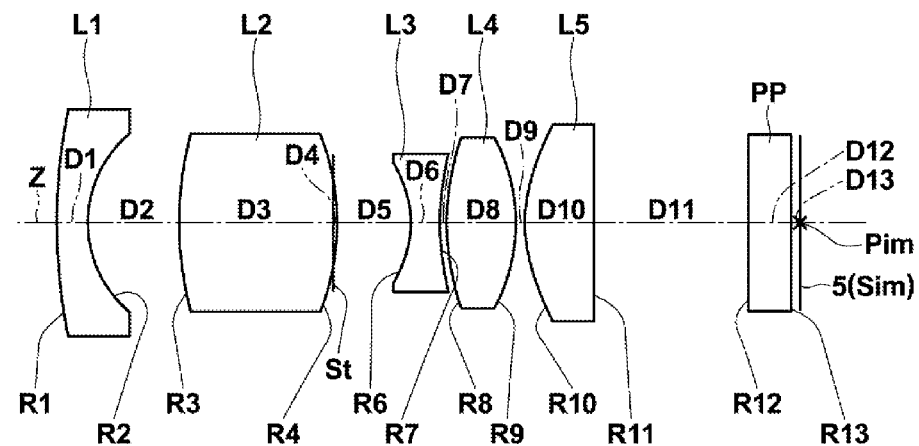
FIG.6  EXAMPLE 4

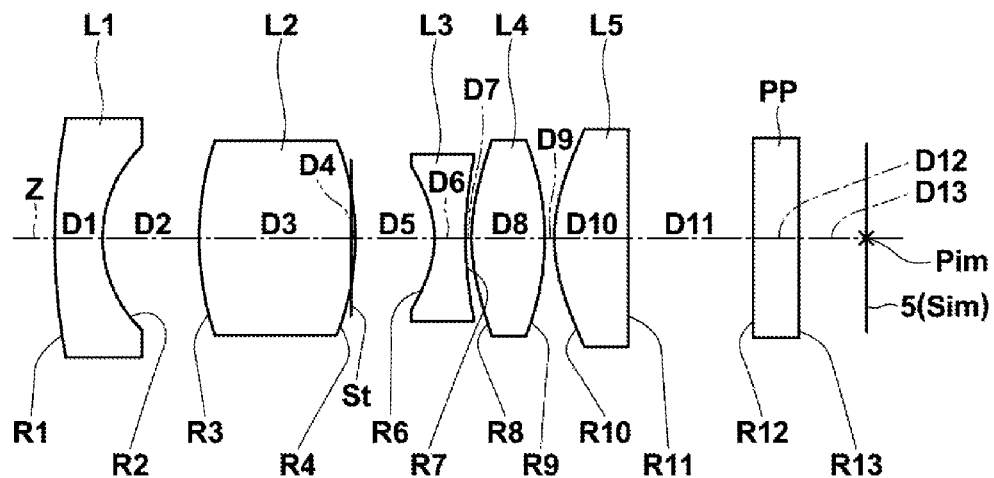
FIG.7 EXAMPLE 5
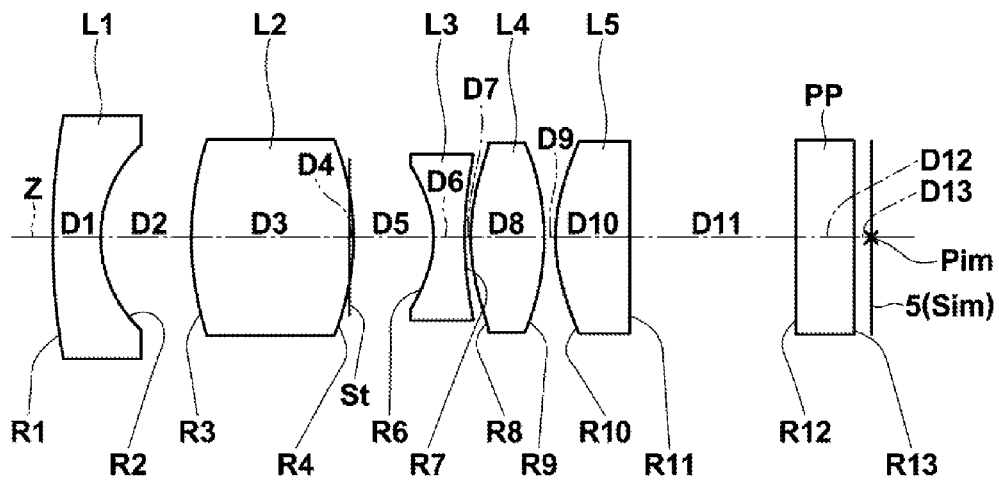
FIG.8 EXAMPLE 6

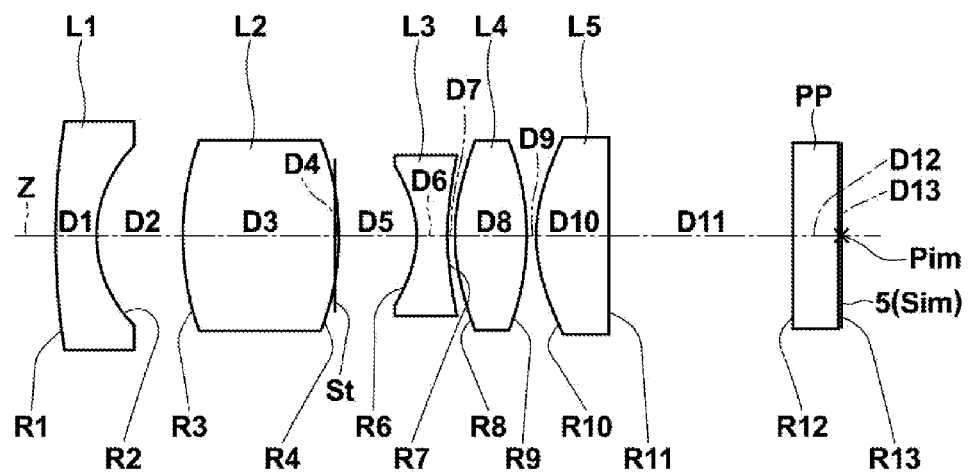
FIG.9 EXAMPLE 7
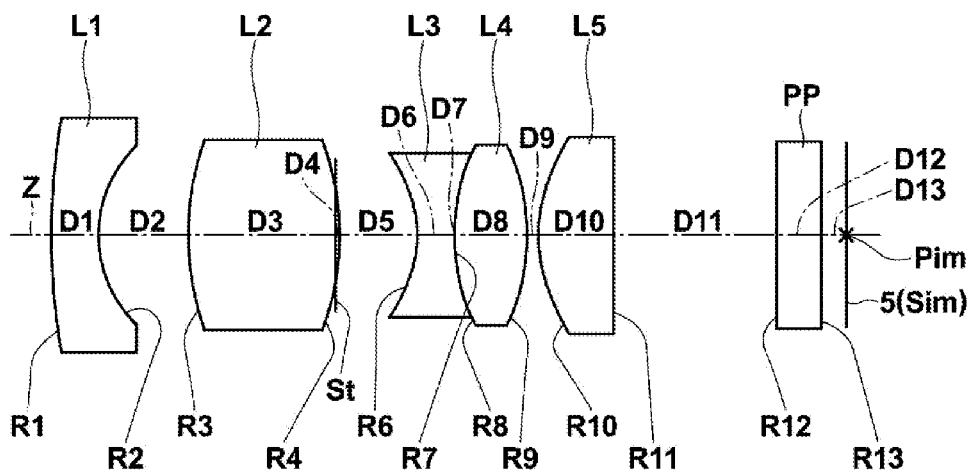
FIG.10 EXAMPLE 8

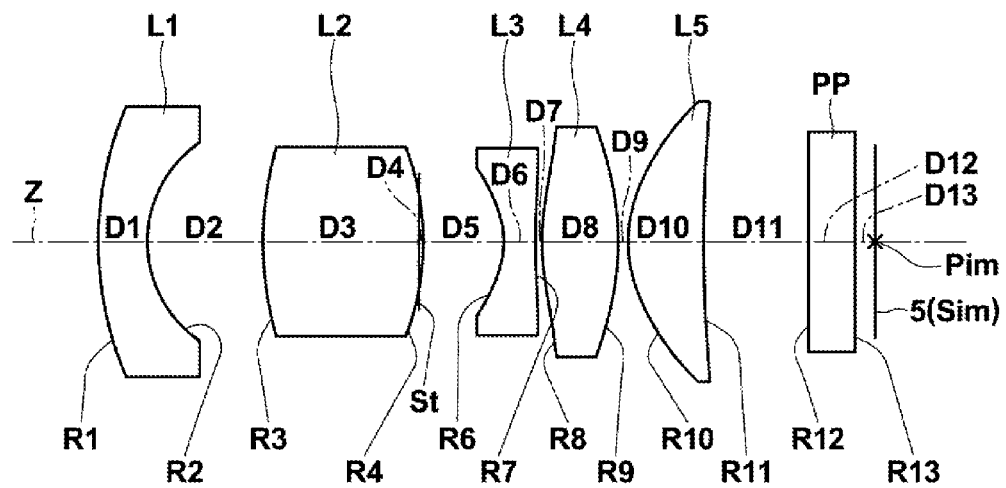
FIG.11   EXAMPLE 9
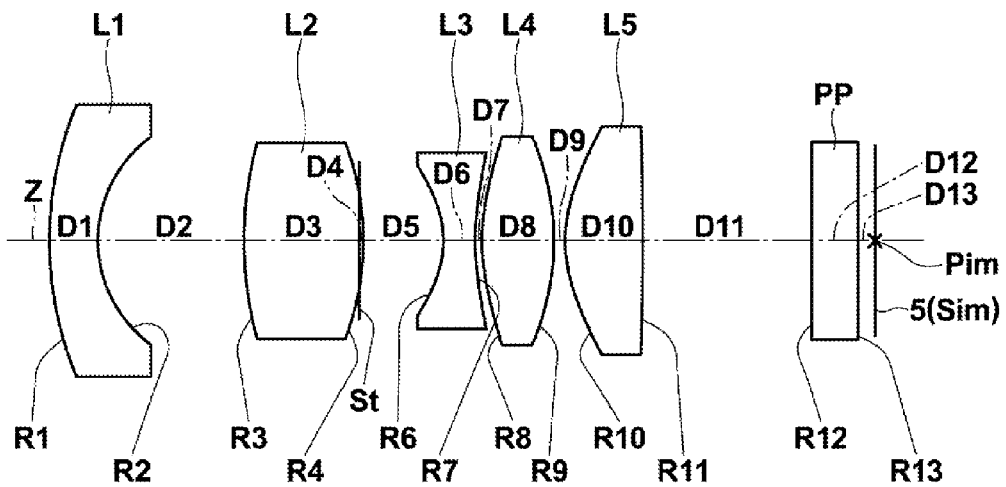
FIG.12   EXAMPLE 10

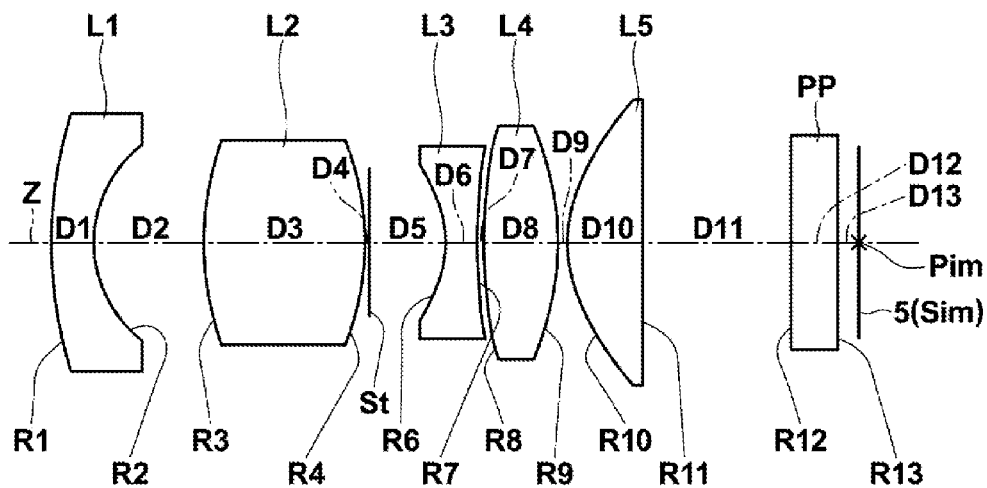
FIG.13  EXAMPLE 11
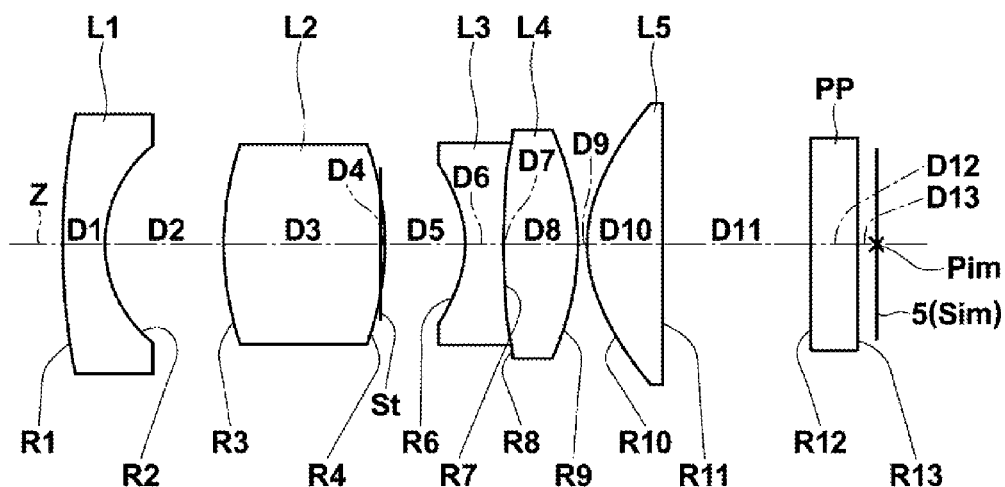
FIG.14  EXAMPLE 12

FIG.15 EXAMPLE 13
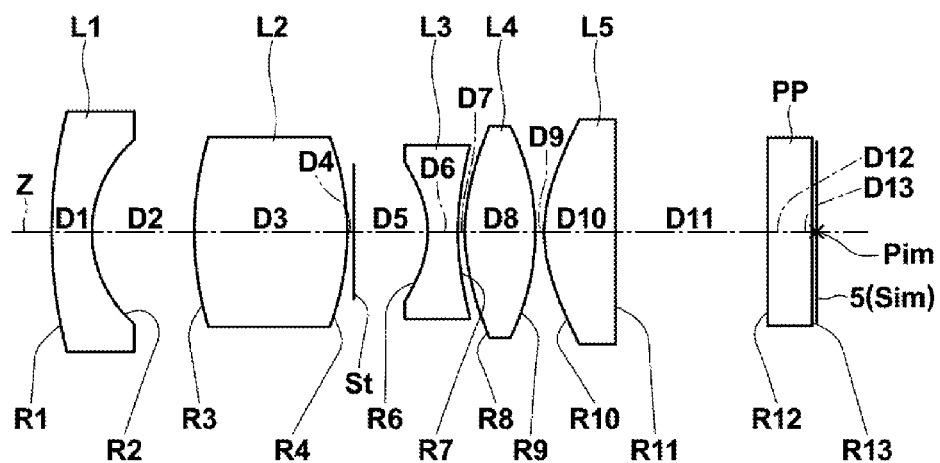
FIG.16 EXAMPLE 1
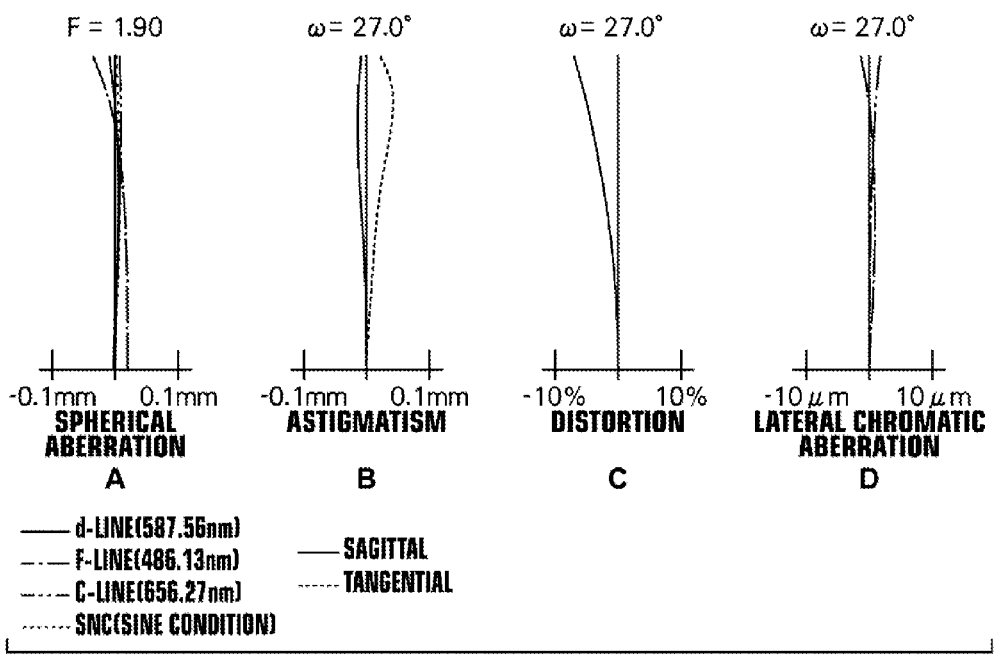

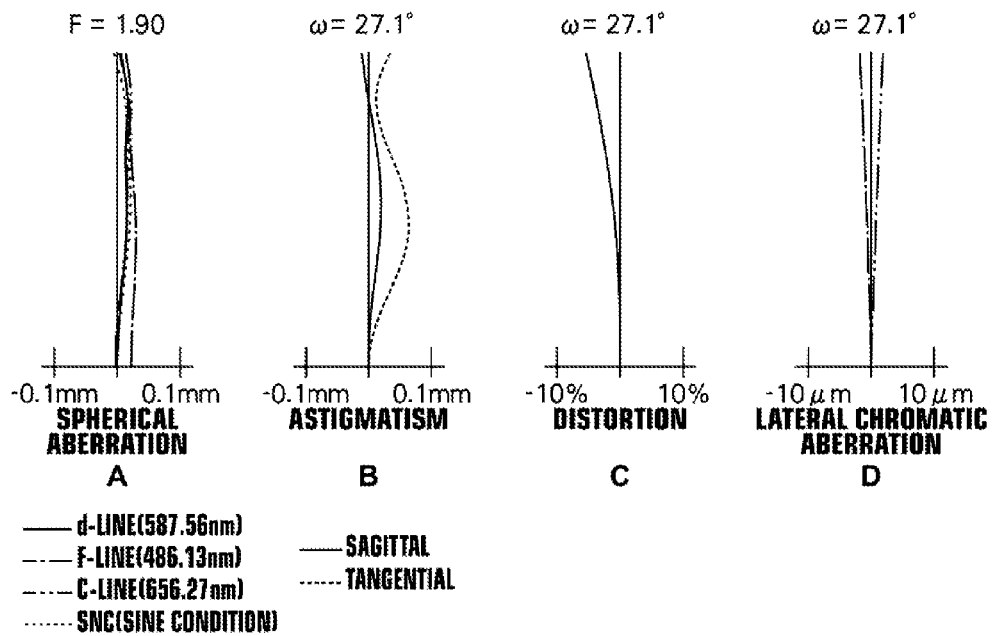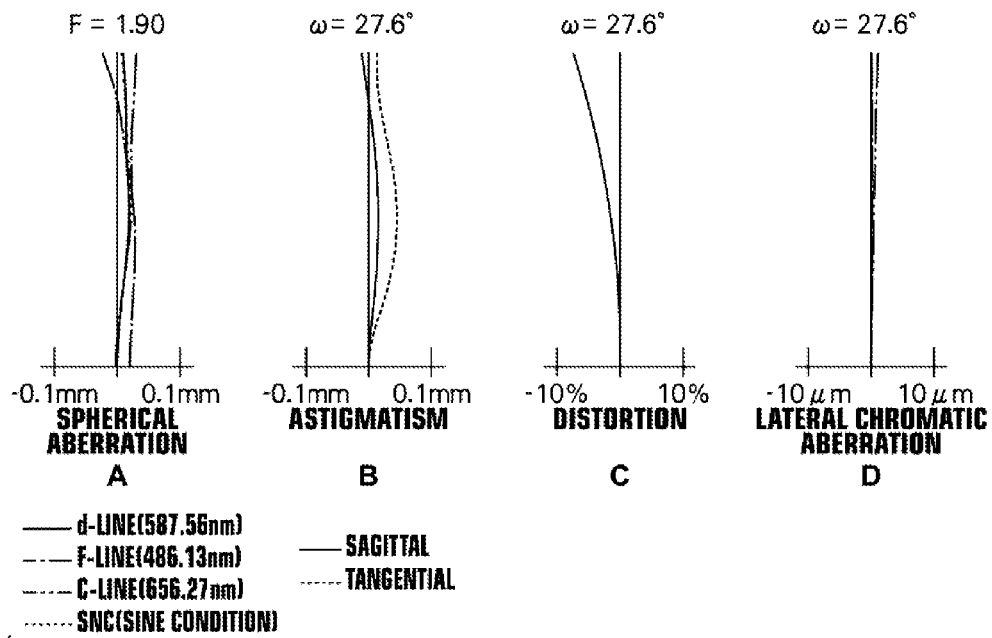

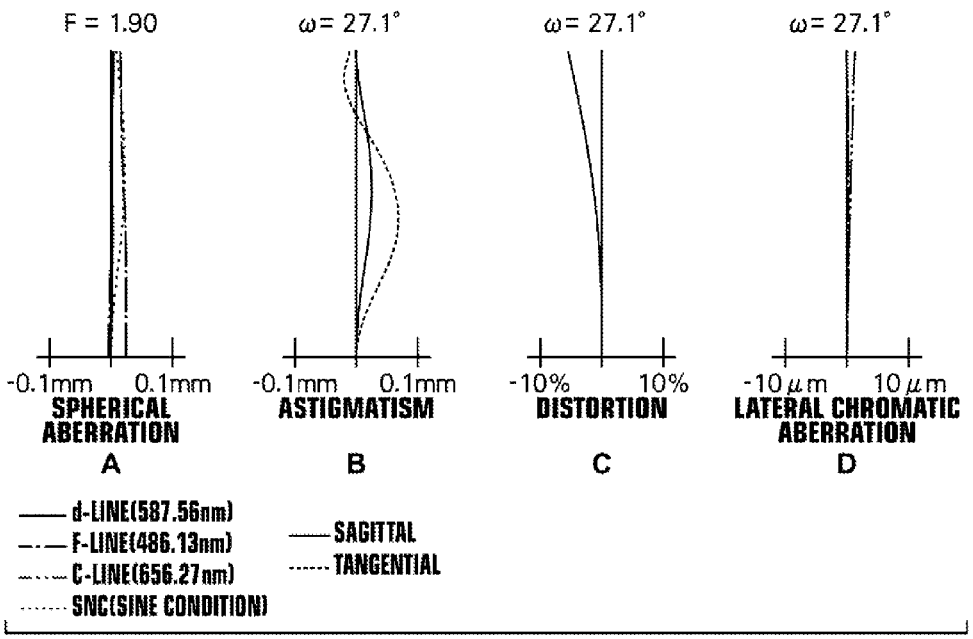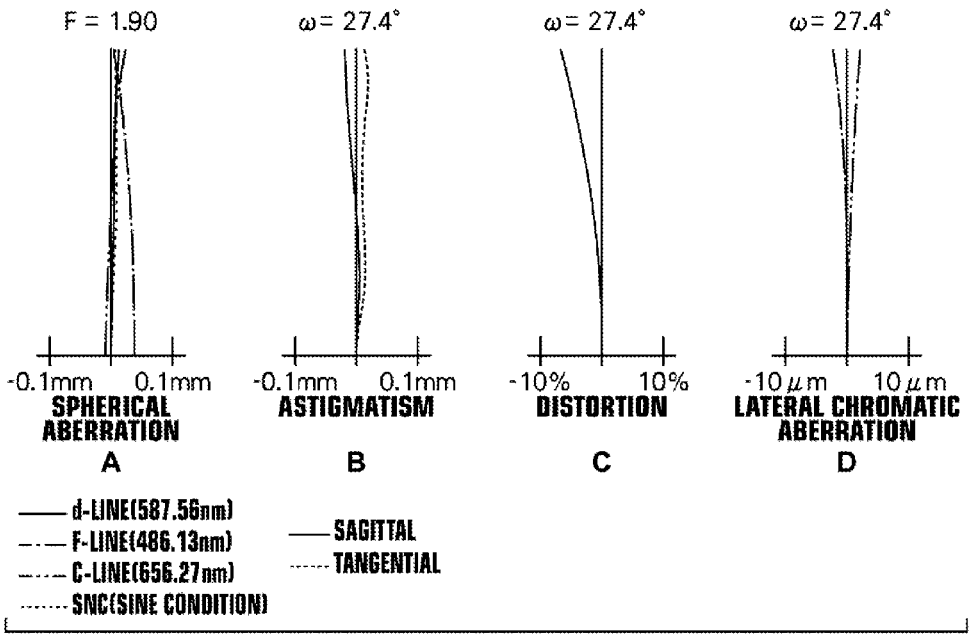

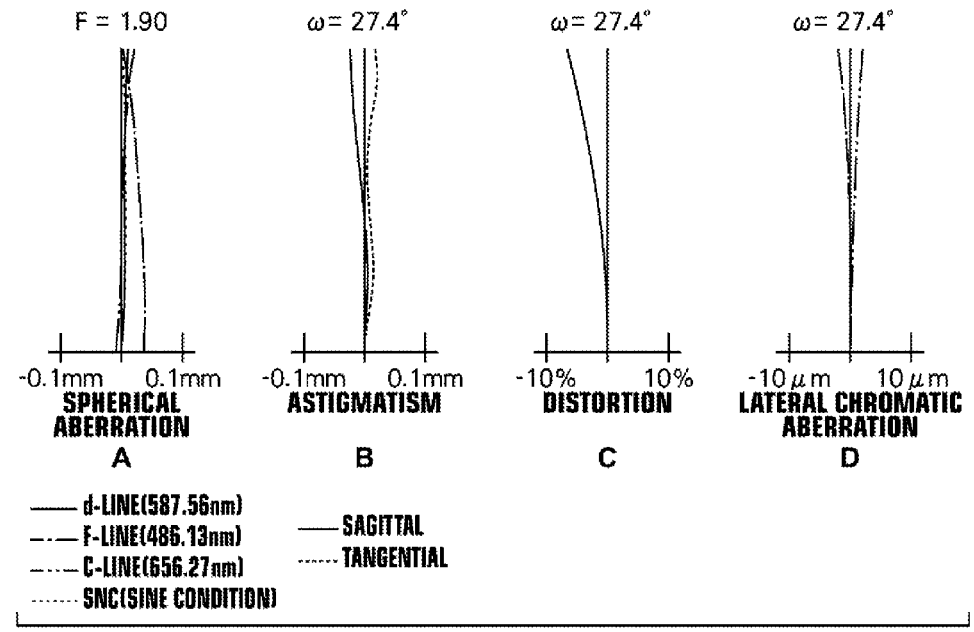
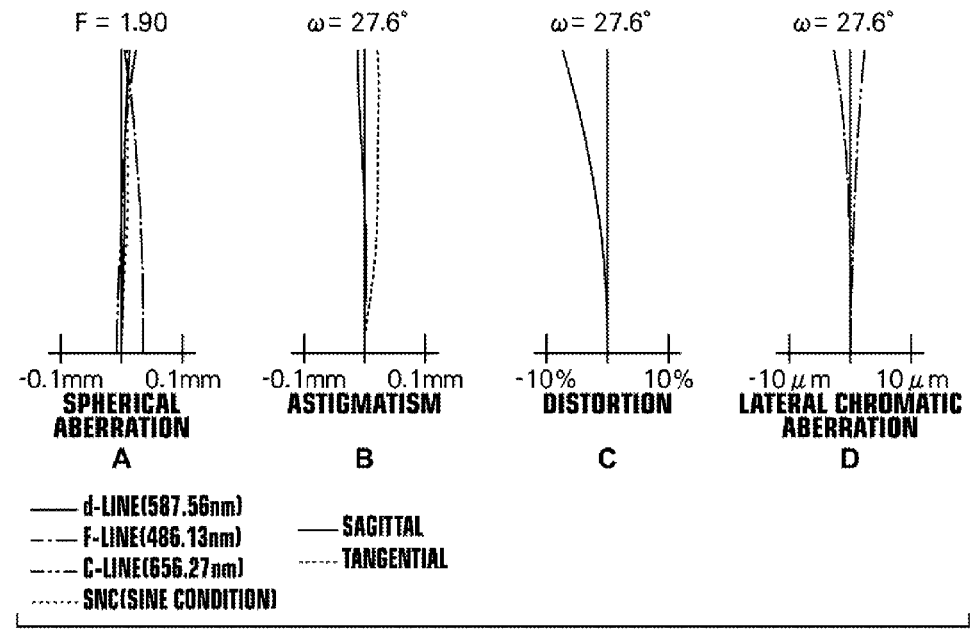

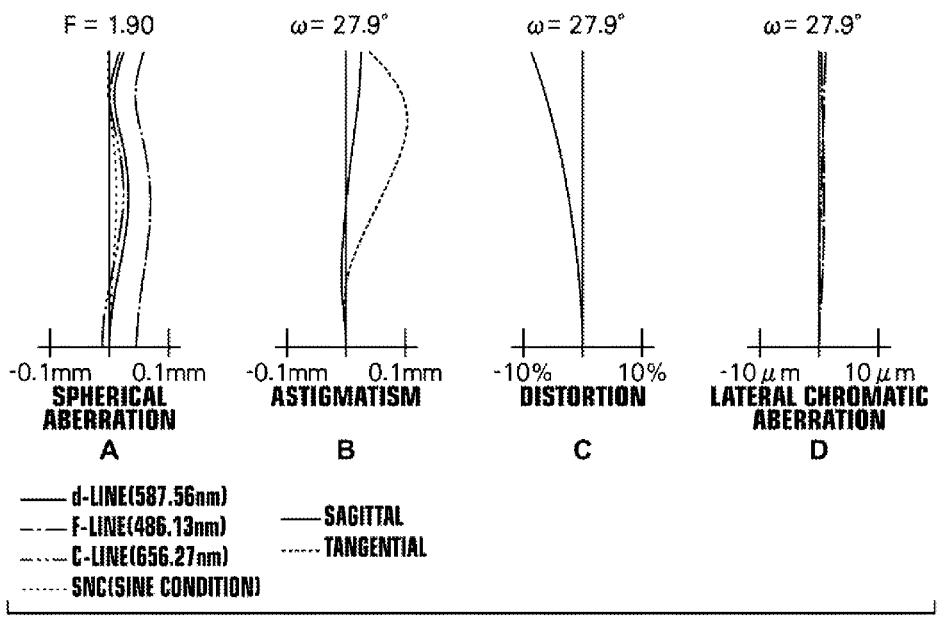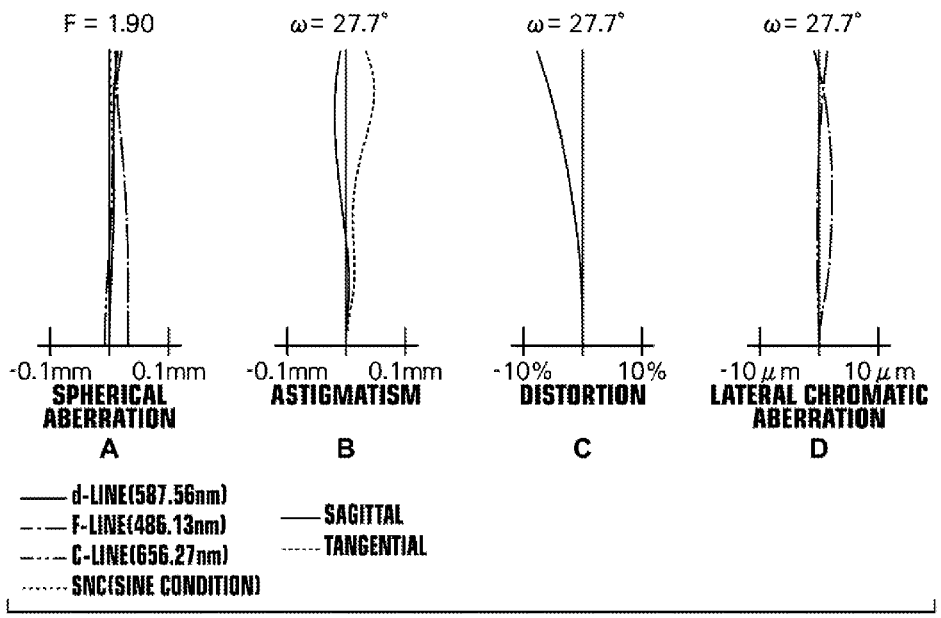

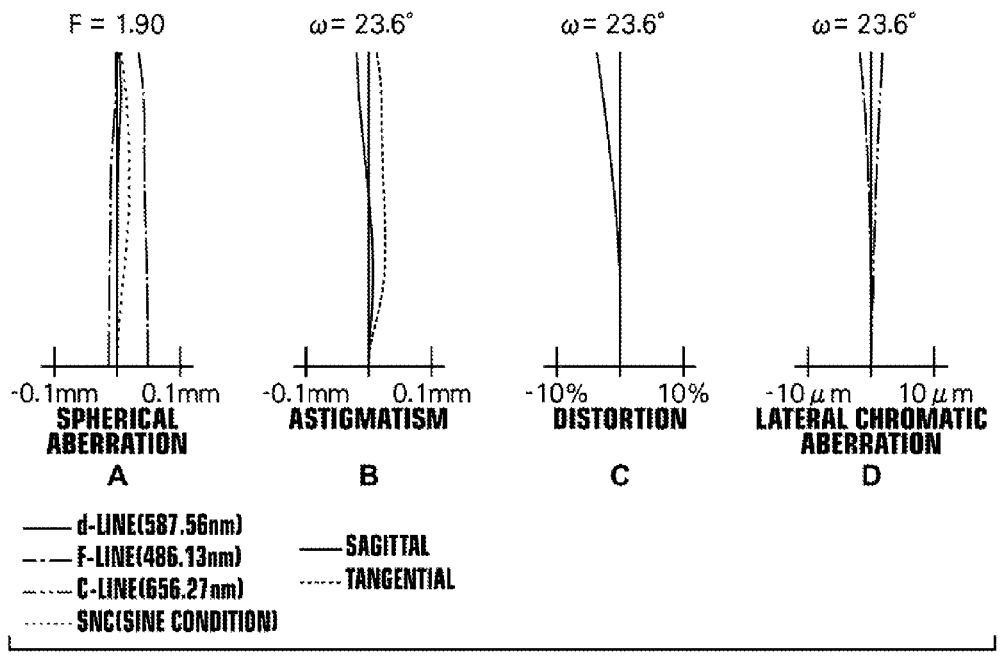
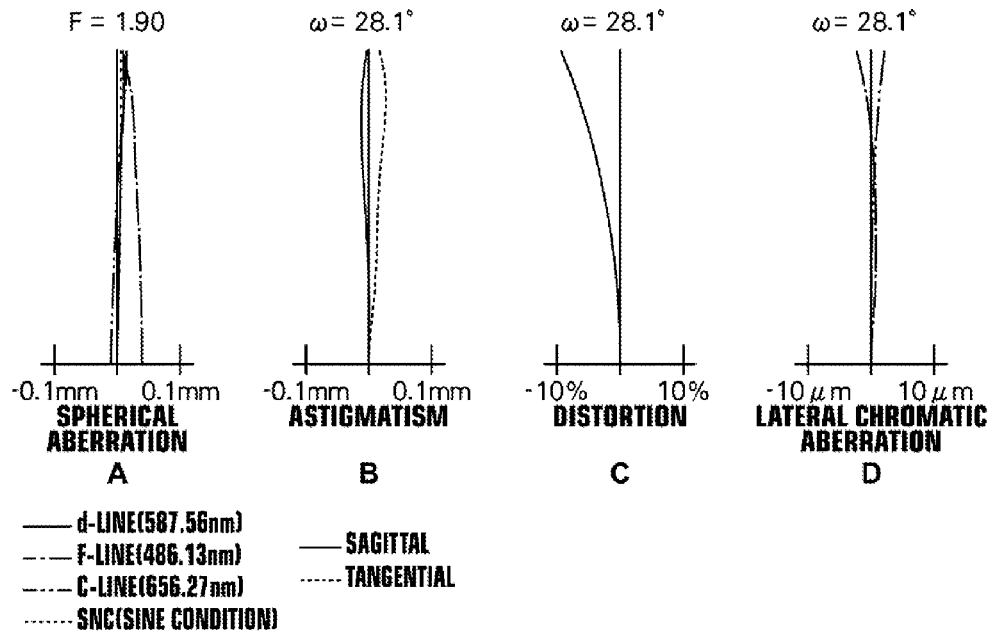

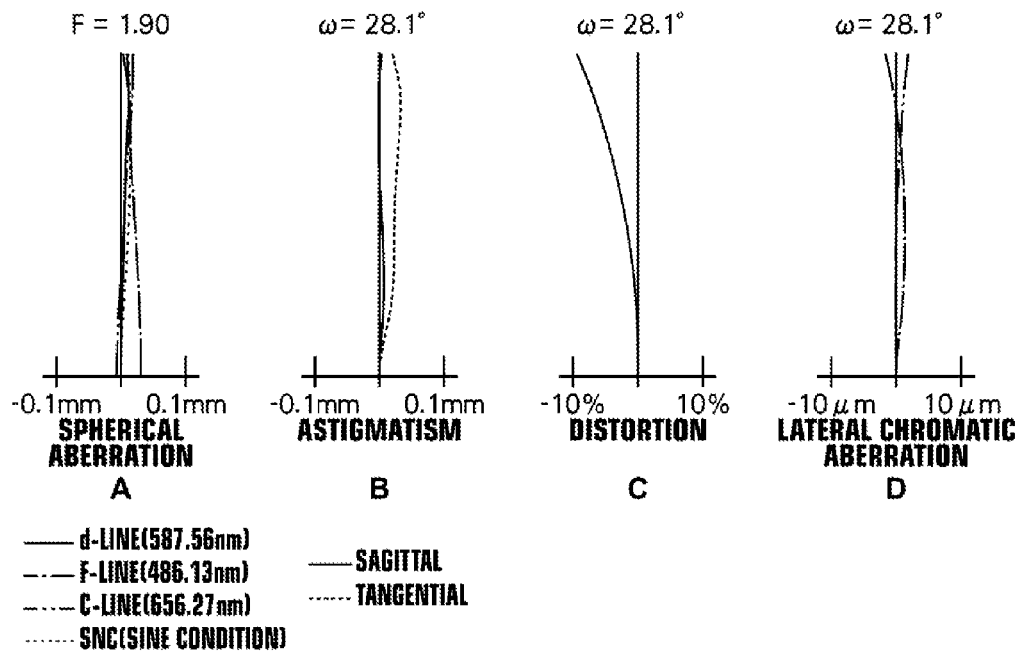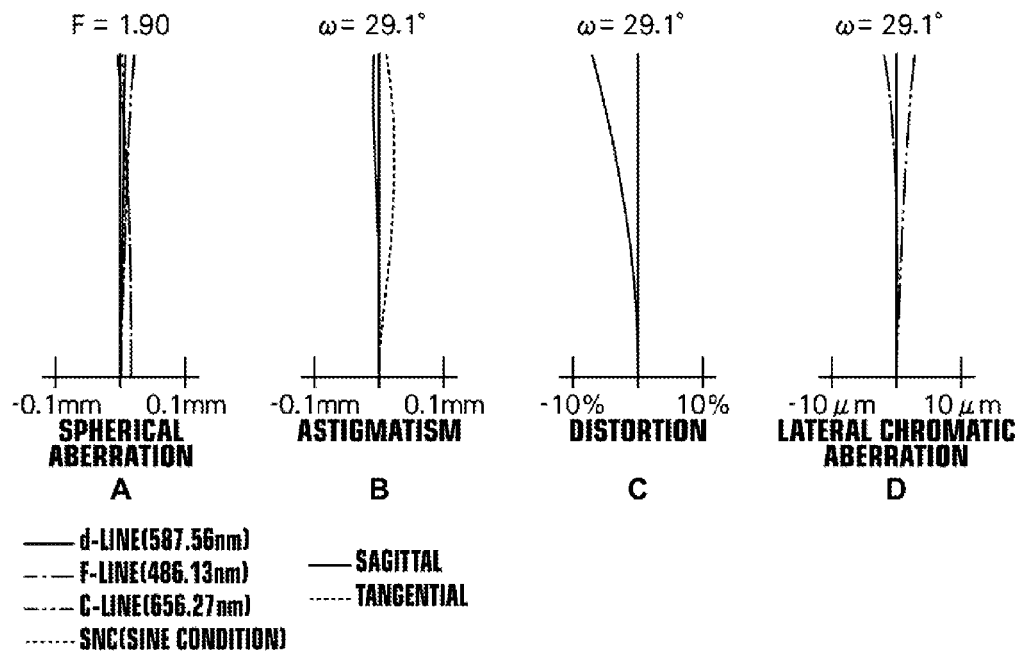

IMAGING LENS AND IMAGING APPARATUS

CROSS-REFERENCE TO RELATED APPLICATIONS

This application is a Continuation of PCT International Application No. PCT/JP2013/007644 filed on Dec. 26, 2013, which claims priority under 35 U.S.C §119(a) to Japanese Patent Application No. 2013-038658 filed on Feb. 28, 2013. Each of the above applications is hereby expressly incorporated by reference, in its entirety, into the present application.

BACKGROUND

The present disclosure relates to an imaging lens and an imaging apparatus, and particularly to an imaging lens appropriate for use in an in-vehicle camera, a camera for a mobile terminal, a surveillance camera or the like using an imaging device, such as a CCD (Charge Coupled Device) and a CMOS (Complementary Metal Oxide Semiconductor), and an imaging apparatus including the imaging lens.

In recent years, the size of an imaging device, such as a CCD and a CMOS, became very small, and the resolution of the imaging device became very high. Consequently, the size of the body of imaging equipment including such an imaging device became smaller. Therefore, reduction in the size of an imaging lens to be mounted on the imaging equipment is also needed in addition to high optical performance of the imaging lens. Meanwhile, lenses mounted on an in-vehicle camera, a surveillance camera and the like need to be configurable at low cost in addition to being small-sized. Further, the lenses need to have a wide angle of view and high performance.

International Patent Publication No. 2012/086193 (Patent Document 1), International Patent Publication No. 2012/086194 (Patent Document 2) and Japanese Unexamined Patent Publication No. 2010-107606 (Patent Document 3) propose imaging lenses, as an imaging lens to be mounted on an in-vehicle camera. The imaging lens consists of five lenses of, in order from the object side, a negative lens, a positive lens, a negative lens, a positive lens and a positive lens.

SUMMARY

Meanwhile, requirements for imaging lenses mounted on an in-vehicle camera, a surveillance camera and the like have become tougher every year, and further reduction in cost, a wider angle of view and higher performance are needed.

In view of the foregoing circumstances, the present disclosure provides an imaging lens that can achieve a lower cost, a wider angle of view and higher performance, and an imaging apparatus including the imaging lens.

A first imaging lens of the present disclosure consists of, in order from the object side, a first lens having negative refractive power, a second lens having positive refractive power, a third lens having negative refractive power, a fourth lens having positive refractive power, and a fifth lens having positive refractive power. Further, the following conditional expressions are satisfied:

$$Nd3<1.75 \quad (1);$$

$$vd3<27 \quad (2); \text{ and}$$

$$1.0 \le (R1+R2)/(R1-R2) \quad (3), \text{ where}$$

Nd3 is a refractive index of the material of the third lens for d-line, vd3 is an Abbe number of the material of the third lens for d-line, R1 is a curvature radius of an object-side surface of the first lens, and R2 is a curvature radius of an image-side surface of the first lens.

A second imaging lens of the present disclosure consists of, in order from the object side, a first lens having negative refractive power, a second lens having positive refractive power, a third lens having negative refractive power, a fourth lens having positive refractive power, and a fifth lens having positive refractive power. Further, the following conditional expressions are satisfied:

$$Nd3<1.75 \quad (1);$$

$$vd3<27 \quad (2);$$

$$0.0 \le (R3+R4)/(R3-R4) \quad (4); \text{ and}$$

$$f12/f<1.5 \quad (5), \text{ where}$$

Nd3 is a refractive index of the material of the third lens for d-line, vd3 is an Abbe number of the material of the third lens for d-line, R3 is a curvature radius of an object-side surface of the second lens, R4 is a curvature radius of an image-side surface of the second lens, f12 is a combined focal length of the first lens and the second lens, and f is a focal length of an entire system.

A third imaging lens consisting of, in order from the object side, a first lens having negative refractive power, a second lens having positive refractive power, a third lens having negative refractive power, a fourth lens having positive refractive power, and a fifth lens having positive refractive power. The material of the third lens, the fourth lens and the fifth lens is plastic, and the following conditional expressions are satisfied:

$$vd3<27 \quad (2); \text{ and}$$

$$1.0 \le (R1+R2)/(R1-R2) \quad (3), \text{ where}$$

vd3 is an Abbe number of the material of the third lens for d-line,

R1 is a curvature radius of an object-side surface of the first lens, and

R2 is a curvature radius of an image-side surface of the first lens.

Here, the first imaging lens of the present disclosure may include the configuration of at least one of the second imaging lens and the third imaging lens of the present disclosure. The second imaging lens of the present disclosure may include the configuration of at least one of the first imaging lens and the third imaging lens of the present disclosure. The third imaging lens of the present disclosure may include the configuration of at least one of the first imaging lens and the second imaging lens of the present disclosure.

The imaging lens of the present disclosure consists of five lenses. However, the imaging lens may include a lens having substantially no refractive power, an optical element, such as an aperture stop and a cover glass, other than lenses, a mechanism part, such as a lens flange, a lens barrel, an imaging device and a hand-shake blur correction mechanism, and the like in addition to the five lenses.

In the present disclosure, the surface shape of a lens, such as a convex surface, a concave surface, a flat surface, biconcave, meniscus, biconvex, plano-convex and plano-concave, and the sign of the refractive power of a lens, such as positive and negative, are considered in a paraxial region, unless otherwise mentioned, when the lens includes an aspheric surface. Further, in the present disclosure, the sign of a curvature radius is positive when a surface shape is convex toward the object side, and negative when a surface shape is convex toward the image side. The expression "has positive refractive power at a center of a lens surface" means that the paraxial curvature of the lens surface is a value making the lens surface form a convex surface. Further, the expression "has negative refractive power at a center of a lens surface" means that the paraxial curvature of the lens surface is a value making the lens surface form a concave surface.

In the first through third imaging lenses of the present disclosure, an image-side surface of the third lens may be an aspheric surface, and have negative refractive power both at a center and at an effective diameter edge, and be shaped in such a manner that the negative refractive power at the effective diameter edge is weaker, compared with the negative refractive power at the center.

Further, in the first through third imaging lenses of the present disclosure, an object-side surface of the fourth lens may be an aspheric surface, and have positive refractive power both at a center and at an effective diameter edge, and be shaped in such a manner that the positive refractive power at the effective diameter edge is weaker, compared with the positive refractive power at the center.

Further, in the first through third imaging lenses of the present disclosure, an object-side surface of the fifth lens may be an aspheric surface, and have positive refractive power both at a center and at an effective diameter edge, and be shaped in such a manner that the positive refractive power at the effective diameter edge is weaker, compared with the positive refractive power at the center.

The expression "has positive refractive power at an effective diameter edge" means that the surface is convex at the effective diameter edge. The expression "has negative refractive power at an effective diameter edge" means that the surface is concave at the effective diameter edge.

The expression "shaped in such a manner that the refractive power at the effective diameter edge is weaker, compared with the refractive power at the center" means that whether a surface has positive refractive power or negative refractive power, the surface is "shaped in such a manner that the refractive power at the effective diameter edge is weaker, compared with the refractive power at the center."

In the first through third imaging lenses of the present disclosure, the first lens may be a meniscus lens with its convex surface facing the object side.

In the first through third imaging lenses of the present disclosure, it is desirable that the following conditional expressions (4) through (16) are satisfied. A desirable mode may include the configuration of one of conditional expressions (4) through (16), or arbitrary two or more of them in combination:

$$0.0 \leq (R3+R4)/(R3-R4) \quad (4);$$

$$f12/f<1.5 \quad (5);$$

$$0.0<R1/f \quad (6);$$

$$-3.0<f1/f<-0.5 \quad (7);$$

$$-0.8<(R8+R9)/(R8-R9)<0.8 \quad (8);$$

$$-2.5<(R10+R11)/(R10-R11)<-0.4 \quad (9);$$

$$-2.0<f3/f<-0.2 \quad (10);$$

$$0.5<f4/f<2.5 \quad (11);$$

$$-3.5<f45/f3<-0.3 \quad (12);$$

$$0.5<f345/f<4.0 \quad (13);$$

$$0.2<f12/f345<3.0 \quad (14);$$

$$0.2<(DA+DB)/f<3.0 \quad (15); \text{ and}$$

$$-3.0<f1/f2<-0.6 \quad (16), \text{ where}$$

f is a focal length of an entire system,
f1 is a focal length of the first lens,
f2 is a focal length of the second lens,
f3 is a focal length of the third lens,
f4 is a focal length of the fourth lens,
f12 is a combined focal length of the first lens and the second lens,
f45 is a combined focal length of the fourth lens and the fifth lens,
f345 is a combined focal length of the third lens, the fourth lens and the fifth lens,
R1 is a curvature radius of an object-side surface of the first lens,
R3 is a curvature radius of an object-side surface of the second lens,
R4 is a curvature radius of an image-side surface of the second lens,
R8 is a curvature radius of an object-side surface of the fourth lens,
R9 is a curvature radius of an image-side surface of the fourth lens,
R10 is a curvature radius of an object-side surface of the fifth lens,
R11 is a curvature radius of an image-side surface of the fifth lens,
DA is a center thickness of the second lens, and
DB is an air space between the second lens and the third lens.

An imaging apparatus of the present disclosure includes at least one of the first through third imaging lenses of the present disclosure, which is mounted thereon.

According to the first imaging lens of the present disclosure, the arrangement of refractive power in an entire system and the like are appropriately set in a lens system consisting of at least five lenses, and conditional expressions (1) through (3) are satisfied. Therefore, a smaller size, a lower cost and a wider angle of view are achievable, and it is also possible to secure a back focus. Further, various aberrations are excellently corrected, and an imaging lens having high optical performance in which an excellent image is obtainable even in a peripheral portion of an image formation area is achievable.

According to the second imaging lens of the present disclosure, the arrangement of refractive power in an entire system and the like are appropriately set in a lens system consisting of at least five lenses, and conditional expressions (1), (2), (4) and (5) are satisfied. Therefore, a smaller size, a lower cost and a wider angle of view are achievable, and it is also possible to secure a back focus. Further, various aberrations are excellently corrected, and an imaging lens having high optical performance in which an excellent image is obtainable even in a peripheral portion of an image formation area is achievable.

According to the third imaging lens of the present disclosure, the arrangement of refractive power in an entire system, the material of lenses and the like are appropriately set in a lens system consisting of at least five lenses, and conditional expressions (2) and (3) are satisfied. Therefore, a smaller size, a lower cost and a wider angle of view are achievable, and it is also possible to secure a back focus. Further, various aberrations are excellently corrected, and an imaging lens having high optical performance in which an excellent image is obtainable even in a peripheral portion of an image formation area is achievable.

The imaging apparatus of the present disclosure includes the imaging lens of the present disclosure. Therefore, the imaging apparatus is configurable in small size and at low cost, and imaging with a wide angle of view is possible, and excellent images with high resolution are obtainable.

BRIEF DESCRIPTION OF THE DRAWINGS

FIG. 2 is a diagram for explaining the surface shape of a third lens, and the like;

FIG. 3 is a sectional diagram illustrating the lens configuration of an imaging lens in Example 1 of the present disclosure;

FIG. 4 is a sectional diagram illustrating the lens configuration of an imaging lens in Example 2 of the present disclosure;

FIG. 5 is a sectional diagram illustrating the lens configuration of an imaging lens in Example 3 of the present disclosure;

FIG. 6 is a sectional diagram illustrating the lens configuration of an imaging lens in Example 4 of the present disclosure;

FIG. 7 is a sectional diagram illustrating the lens configuration of an imaging lens in Example 5 of the present disclosure;

FIG. 8 is a sectional diagram illustrating the lens configuration of an imaging lens in Example 6 of the present disclosure;

FIG. 9 is a sectional diagram illustrating the lens configuration of an imaging lens in Example 7 of the present disclosure;

FIG. 10 is a sectional diagram illustrating the lens configuration of an imaging lens in Example 8 of the present disclosure;

FIG. 11 is a sectional diagram illustrating the lens configuration of an imaging lens in Example 9 of the present disclosure;

FIG. 12 is a sectional diagram illustrating the lens configuration of an imaging lens in Example 10 of the present disclosure;

FIG. 13 is a sectional diagram illustrating the lens configuration of an imaging lens in Example 11 of the present disclosure;

FIG. 14 is a sectional diagram illustrating the lens configuration of an imaging lens in Example 12 of the present disclosure;

FIG. 15 is a sectional diagram illustrating the lens configuration of an imaging lens in Example 13 of the present disclosure;

FIG. 16, Sections A through D are aberration diagrams of the imaging lens in Example 1 of the present disclosure;

FIG. 17, Sections A through D are aberration diagrams of the imaging lens in Example 2 of the present disclosure;

FIG. 18, Sections A through D are aberration diagrams of the imaging lens in Example 3 of the present disclosure;

FIG. 19, Sections A through D are aberration diagrams of the imaging lens in Example 4 of the present disclosure;

FIG. 20, Sections A through D are aberration diagrams of the imaging lens in Example 5 of the present disclosure;

FIG. 21, Sections A through D are aberration diagrams of the imaging lens in Example 6 of the present disclosure;

FIG. 22, Sections A through D are aberration diagrams of the imaging lens in Example 7 of the present disclosure;

FIG. 23, Sections A through D are aberration diagrams of the imaging lens in Example 8 of the present disclosure;

FIG. 24, Sections A through D are aberration diagrams of the imaging lens in Example 9 of the present disclosure;

FIG. 25, Sections A through D are aberration diagrams of the imaging lens in Example 10 of the present disclosure;

FIG. 26, Sections A through D are aberration diagrams of the imaging lens in Example 11 of the present disclosure;

FIG. 27, Sections A through D are aberration diagrams of the imaging lens in Example 12 of the present disclosure;

FIG. 28, Sections A through D are aberration diagrams of the imaging lens in Example 13 of the present disclosure.

DESCRIPTION OF THE PREFERRED EMBODIMENTS

Hereinafter, embodiments of the present disclosure will be described in detail with reference to drawings.
[Embodiments of Imaging Lens]

Figure 1:
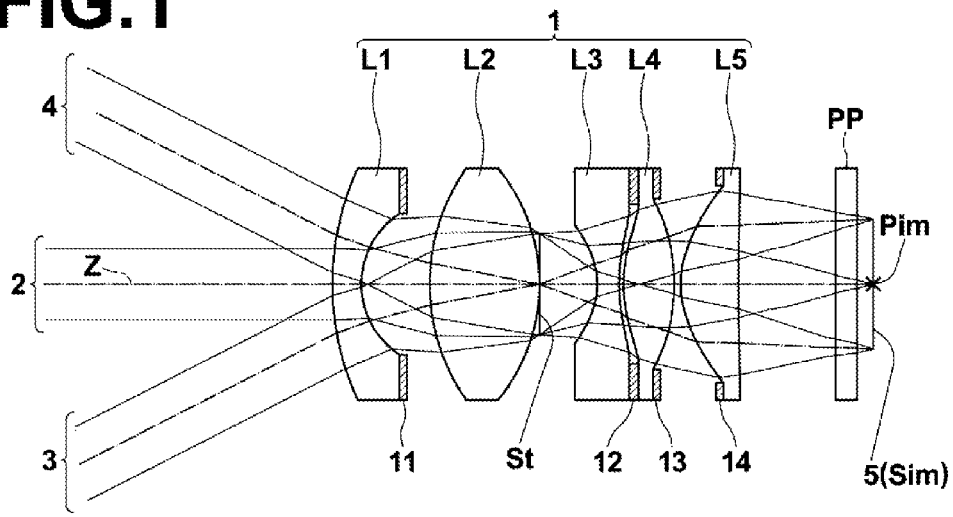
FIG. 1 is a diagram illustrating the configuration of an imaging lens according to an embodiment of the present disclosure and optical paths.

First, an imaging lens according to an embodiment of the present disclosure will be described with reference to FIG. 1. FIG. 1 is a diagram illustrating the configuration of an imaging lens 1 according to an embodiment of the present disclosure and optical paths. The imaging lens 1 illustrated in FIG. 1 corresponds to an imaging lens in Example 1 of the present disclosure, which will be described later.

In FIG. 1, the left side of the diagram is the object side, and the right side of the diagram is the image side. Axial rays 2 from an object point at a distance of infinity and off-axial rays 3, 4 at full angle of view 2ω are also illustrated. FIG. 1 illustrates also an imaging device 5 arranged at image plane Sim including image point Pim of the imaging lens 1, considering a case of applying the imaging lens 1 to an imaging apparatus. The imaging device 5 converts an optical image formed by the imaging lens 1 into electrical signals. For example, a CCD image sensor, a CMOS image sensor or the like may be used as the imaging device 5.

When the imaging lens 1 is applied to an imaging apparatus, it is desirable to set a cover glass, a low-pass filter or an infrared ray cut filter and the like, based on the configuration of a camera on which the lens is mounted. FIG. 1 illustrates an example in which parallel-flat-plate-shaped optical member PP, which is assumed to be such elements, is arranged between a lens closest to the image side and the imaging device 5 (image plane Sim).

First, the configuration of the first embodiment of the present disclosure will be described. An imaging lens according to the first embodiment of the present disclosure consists of, in order from the object side, first lens L1 having negative refractive power, second lens L2 having positive refractive power, third lens L3 having negative refractive power, fourth lens L4 having positive refractive power, and fifth lens L5 having positive refractive power. In the example illustrated in FIG. 1, aperture stop St is arranged between second lens L2 and third lens L3. In FIG. 1, aperture stop St does not represent the shape nor size of the aperture stop, but the position of the aperture stop on optical axis Z.

Further, the imaging lens in the first embodiment is configured to satisfy the following conditional expressions (1) through (3):

$$Nd3<1.75 \qquad (1);$$

$$vd3<27 \qquad (2); \text{ and}$$

$$1.0 \le (R1+R2)/(R1-R2) \qquad (3), \text{ where}$$

Nd3 is a refractive index of the material of third lens L3 for d-line, vd3 is an Abbe number of the material of third lens L3 for d-line, R1 is a curvature radius of an object-side surface of first lens L1, and R2 is a curvature radius of an image-side surface of first lens L1.

In the imaging lens of the first embodiment, first lens L1, which is closest to the object side, has negative refractive power. Therefore, it is possible to widen the angle of view of the lens system, and a back focus is easily secured. Further, the size of the lens system in the direction of the diameter is easily reduced. Since second lens L2 has positive refractive power, a spherical aberration and curvature of field are easily corrected. Further, since fourth lens L4 and fifth lens L5 have positive refractive power, it is possible to divide the positive refractive power, and thereby minimizing generation of a spherical aberration. Even if the imaging lens is a fast optical system, for example, having an F-number of 2.0 or less, excellent optical performance is achievable.

When the upper limit of conditional expression (1) is satisfied, it is possible to lower the refractive index of the material of third lens L3, and the cost of third lens L3 is easily suppressed.

When the upper limit of conditional expression (2) is satisfied, the Abbe number of the material of third lens L3 is easily reduced, and a longitudinal chromatic aberration is easily corrected.

First lens L1 has negative refractive power. Therefore, when the lower limit of conditional expression (3) is satisfied, it is possible to make first lens L1 a meniscus lens with its convex surface facing the object side, and distortion is easily corrected.

The imaging lens of the first embodiment consists of at least five lenses, which are a small number of lenses. Therefore, it is possible to reduce the total length in the direction of the optical axis as well as reducing the cost, and to secure a back focus. Further, various aberrations are excellently corrected, and an imaging lens having high optical performance in which an excellent image is obtainable even in a peripheral portion of an image formation area is achievable.

Next, the configuration of the second embodiment of the present disclosure will be described. An imaging lens according to the second embodiment of the present disclosure consists of, in order from the object side, first lens L1 having negative refractive power, second lens L2 having positive refractive power, third lens L3 having negative refractive power, fourth lens L4 having positive refractive power, and fifth lens L5 having positive refractive power. In the example illustrated in FIG. 1, aperture stop St is arranged between second lens L2 and third lens L3.

Further, the imaging lens in the second embodiment is configured to satisfy the following conditional expressions (1), (2), (4) and (5):

$$Nd3<1.75 \qquad (1);$$

$$vd3<27 \qquad (2);$$

$$0.0 \le (R3+R4)/(R3-R4) \qquad (4); \text{ and}$$

$$f12/f<1.5 \qquad (5), \text{ where}$$

Nd3 is a refractive index of the material of third lens L3 for d-line, vd3 is an Abbe number of the material of third lens L3 for d-line, R3 is a curvature radius of an object-side surface of second lens L2, R4 is a curvature radius of an image-side surface of second lens L2, f12 is a combined focal length of first lens L1 and second lens L2, and f is a focal length of an entire system.

In the imaging lens of the second embodiment, first lens L1, which is closest to the object side, has negative refractive power. Therefore, it is possible to widen the angle of view of the lens system, and a back focus is easily secured. Further, the size of the lens system in the direction of the diameter is easily reduced. Since second lens L2 has positive refractive power, a spherical aberration and curvature of field are easily corrected. Further, since fourth lens L4 and fifth lens L5 have positive refractive power, it is possible to divide the positive refractive power, and thereby minimizing generation of a spherical aberration. Even if the imaging lens is a fast optical system, for example, having an F-number of 2.0 or less, excellent optical performance is achievable.

When the upper limit of conditional expression (1) is satisfied, it is possible to lower the refractive index of the material of third lens L3, and the cost of third lens L3 is easily suppressed.

When the upper limit of conditional expression (2) is satisfied, the Abbe number of the material of third lens L3 is easily reduced, and a longitudinal chromatic aberration is easily corrected.

When the lower limit of conditional expression (4) is satisfied, the absolute value of the curvature radius of the object-side surface of second lens L2 is easily made greater than the absolute value of the curvature radius of the image-side surface of second lens L2, and distortion is easily corrected.

When the upper limit of conditional expression (5) is satisfied, a combined focal length of first lens L1 and second lens L2 is easily prevented from becoming a large positive value, and curvature of field is easily corrected.

The imaging lens of the second embodiment consists of at least five lenses, which are a small number of lenses. Therefore, it is possible to reduce the total length in the direction of the optical axis as well as reducing the cost, and to secure a back focus. Further, various aberrations are excellently corrected, and an imaging lens having high optical performance in which an excellent image is obtainable even in a peripheral portion of an image formation area is achievable.

Next, the configuration of the third embodiment of the present disclosure will be described. An imaging lens according to the third embodiment of the present disclosure consists of, in order from the object side, first lens L1 having negative refractive power, second lens L2 having positive refractive power, third lens L3 having negative refractive power, fourth lens L4 having positive refractive power, and fifth lens L5 having positive refractive power. The material of third lens L3, fourth lens L4 and fifth lens L5 is plastic. In the example illustrated in FIG. 1, aperture stop St is arranged between second lens L2 and third lens L3.

Further, the imaging lens in the third embodiment is configured to satisfy the following conditional expressions (2) and (3):

$$vd3<27 \quad (2); \text{ and}$$

$$1.0 \le (R1+R2)/(R1-R2) \quad (3), \text{ where}$$

vd3 is an Abbe number of the material of third lens L3 for d-line,

R1 is a curvature radius of an object-side surface of first lens L1, and

R2 is a curvature radius of an image-side surface of first lens L1.

In the imaging lens of the third embodiment, first lens L1, which is closest to the object side, has negative refractive power. Therefore, it is possible to widen the angle of view of the lens system, and a back focus is easily secured. Further, the size of the lens system in the direction of the diameter is easily reduced. Since second lens L2 has positive refractive power, a spherical aberration and curvature of field are easily corrected. Further, since fourth lens L4 and fifth lens L5 have positive refractive power, it is possible to divide the positive refractive power, and thereby minimizing generation of a spherical aberration. Even if the imaging lens is a fast optical system, for example, having an F-number of 2.0 or less, excellent optical performance is achievable.

In the imaging lens of the third embodiment, the material of third lens L3, fourth lens L4 and fifth lens L5 is plastic. Therefore, the cost of the lens system is easily suppressed.

When the upper limit of conditional expression (2) is satisfied, the Abbe number of the material of third lens L3 is easily reduced, and a longitudinal chromatic aberration is easily corrected.

First lens L1 has negative refractive power. Therefore, when the lower limit of conditional expression (3) is satisfied, it is possible to make first lens L1 a meniscus lens with its convex surface facing the object side, and distortion is easily corrected.

The imaging lens of the third embodiment consists of at least five lenses, which are a small number of lenses. Therefore, it is possible to reduce the size of the total length in the direction of the optical axis as well as reducing the cost, and to secure a back focus. Further, various aberrations are excellently corrected, and an imaging lens having high optical performance in which an excellent image is obtainable even in a peripheral portion of an image formation area is achievable.

Here, the imaging lens according to the first embodiment may include the configuration of the imaging lens according to the second embodiment or the imaging lens according to the third embodiment or the configuration of the imaging lenses according to the second and third embodiments. Further, the imaging lens according to the second embodiment may include the configuration of the imaging lens according to the first embodiment or the imaging lens according to the third embodiment or the configuration of the imaging lenses according to the first and third embodiments. Further, the imaging lens according to the third embodiment may include the configuration of the imaging lens according to the first embodiment or the imaging lens according to the second embodiment or the configuration of the imaging lenses according to the first and second embodiments.

Next, configurations that the imaging lenses according to the first through third embodiments of the present disclosure desirably include will be raised, and their actions and effects will be described. A desirable mode may include one of the following configurations, or arbitrary two or more of them in combination.

$$0.0 \le (R3+R4)/(R3-R4) \quad (4);$$

$$f12/f<1.5 \quad (5);$$

$$0.0<R1/f \quad (6);$$

$$-3.0<f1/f<-0.5 \quad (7);$$

$$-0.8<(R8+R9)/(R8-R9)<0.8 \quad (8);$$

$$-2.5<(R10+R11)/(R10-R11)<-0.4 \quad (9);$$

$$-2.0<f3/f<-0.2 \quad (10);$$

$$0.5<f4/f<2.5 \quad (11);$$

$$-3.5<f45/f3<-0.3 \quad (12);$$

$$0.5<f345/f<4.0 \quad (13);$$

$$0.2<f12/f345<3.0 \quad (14);$$

$$0.2<(DA+DB)/f<3.0 \quad (15); \text{ and}$$

$$-3.0<f1/f2<-0.6 \quad (16), \text{ where}$$

f is a focal length of an entire system,
f1 is a focal length of first lens L1,
f2 is a focal length of second lens L2,
f3 is a focal length of third lens L3,
f4 is a focal length of fourth lens L4,
f12 is a combined focal length of first lens L1 and second lens L2,
f45 is a combined focal length of fourth lens L4 and fifth lens L5,
f345 is a combined focal length of third lens L3, fourth lens L4 and fifth lens L5,
R1 is a curvature radius of an object-side surface of first lens L1,
R3 is a curvature radius of an object-side surface of second lens L2,
R4 is a curvature radius of an image-side surface of second lens L2,
R8 is a curvature radius of an object-side surface of fourth lens L4,
R9 is a curvature radius of an image-side surface of fourth lens L4,
R10 is a curvature radius of an object-side surface of fifth lens L5,
R11 is a curvature radius of an image-side surface of fifth lens L5,
DA is a center thickness of second lens L2, and
DB is an air space between second lens L2 and third lens L3.

When the lower limit of conditional expression (4) is satisfied, the absolute value of the curvature radius of the object-side surface of second lens L2 is easily made greater than the absolute value of the curvature radius of the image-side surface of second lens L2, and distortion is easily corrected.

When the upper limit of conditional expression (5) is satisfied, a combined focal length of first lens L1 and second lens L2 is easily prevented from becoming a large positive value, and curvature of field is easily corrected.
When the lower limit of conditional expression (6) is satisfied, it is possible to easily suppress the refractive power of first lens L1, and to condense light without sharply bending rays at the object-side surface of first lens L1. Therefore, distortion is easily corrected.

When the upper limit of conditional expression (7) is satisfied, the refractive power of first lens L1 is easily suppressed, and curvature of field and distortion are easily corrected. When the lower limit of conditional expression (7) is satisfied, the refractive power of first lens L1 is easily increased, and the angle of view is easily widened.
When the upper limit and the lower limit of conditional expression (8) are satisfied, it is possible to make fourth lens L4 a biconvex lens, and the refractive power of fourth lens L4 is easily increased. Further, a spherical aberration and curvature of field are easily corrected, and a longitudinal chromatic aberration is easily corrected between third lens L3 and fourth lens L4. When the upper limit of conditional expression (8) is satisfied, the curvature radius of the object-side surface of fourth lens L4 is easily prevented from becoming too small, and a longitudinal chromatic aberration is easily corrected. When the lower limit of conditional expression (8) is satisfied, the curvature radius of the image-side surface of fourth lens L4 is easily prevented from becoming too small, and curvature of field and a coma aberration are easily corrected.

When the upper limit of conditional expression (9) is satisfied, the refractive power of fifth lens L5 is easily suppressed, and a spherical aberration is easily corrected, or a back focus is easily secured. When the lower limit of conditional expression (9) is satisfied, the refractive power of fifth lens L5 is easily increased, and a spherical aberration is easily corrected, or an incident angle of peripheral rays entering an image plane is easily suppressed, and shading is easily suppressed.

When the upper limit of conditional expression (10) is satisfied, the refractive power of third lens L3 is easily suppressed, and sensitivity to an error caused by eccentricity is easily suppressed. When the lower limit of conditional expression (10) is satisfied, the refractive power of third lens L3 is easily increased, and a longitudinal chromatic aberration is easily suppressed.

When the upper limit of conditional expression (11) is satisfied, the refractive power of fourth lens L4 is easily increased, and a longitudinal chromatic aberration is easily suppressed between third lens L3 and fourth lens L4. When the lower limit of conditional expression (11) is satisfied, the refractive power of fourth lens L4 is easily suppressed, and positive refractive power is easily divided between fourth lens L4 and fifth lens L5, and a spherical aberration is easily corrected.

When the upper limit of conditional expression (12) is satisfied, the combined refractive power of fourth lens L4 and fifth lens L5 is easily increased. Therefore, the size of the system is easily reduced, and an incident angle of peripheral rays entering an image plane is easily suppressed. When the lower limit of conditional expression (12) is satisfied, the refractive power of third lens L3 is easily increased, and a longitudinal chromatic aberration is easily corrected.

When the upper limit of conditional expression (13) is satisfied, it is possible to increase the combined refractive power of third lens L3 through fifth lens L5, and the size of the lens system is easily reduced, or an incident angle of peripheral rays entering an image plane is easily suppressed.
When the lower limit of conditional expression (13) is satisfied, the combined refractive power of third lens L3 through fifth lens L5 is easily prevented from becoming strong. Therefore, a back focus is easily secured, and a longitudinal chromatic aberration is easily corrected.

First lens L1 has negative refractive power, second lens L2 has positive refractive power, third lens L3 has negative refractive power, and fourth lens L4 and fifth lens L5 have positive refractive power. Therefore, negative refractive power, positive refractive power, negative refractive power, and positive refractive power are arranged in this order from the object side. Since first lens L1 and second lens L2 have a combination of negative refractive power and positive refractive power, an aberration generated in each lens is cancelled out. Further, since third lens L3 through fifth lens L5 have a combination of negative refractive power and positive refractive power, an aberration generated in each lens is cancelled out. Therefore, excellent resolution performance is easily achieved. Further, when conditional expression (14) is satisfied, it is possible to balance the refractive power of first lens L1 and second lens L2 and the refractive power of third lens L3 through fifth lens L5 with each other, and a spherical aberration and curvature of field are easily corrected.

When the upper limit of conditional expression (14) is satisfied, the combined refractive power of third lens L3 through fifth lens L5 is easily prevented from becoming strong, and a back focus is easily secured, or the combined refractive power of first lens L1 and second lens L2 is easily increased, and curvature of field is easily corrected. When the lower limit of conditional expression (14) is satisfied, the combined refractive power of third lens L3 through fifth lens L5 is easily increased, and the size of the lens system is easily reduced, or an incident angle of peripheral rays entering an image plane is easily suppressed.

When the upper limit of conditional expression (15) is satisfied, the size of the lens system is easily reduced. When the lower limit of conditional expression (15) is satisfied, the center thickness of second lens L2 is easily increased, or a distance between second lens L2 and third lens L3 is easily widened, and a spherical aberration and curvature of field are easily corrected.

When the upper limit of conditional expression (16) is satisfied, the refractive power of second lens L2 is easily increased, and a spherical aberration and curvature of field are easily corrected, or the refractive power of first lens L1 is easily prevented from becoming strong, and distortion is easily corrected. When the lower limit of conditional expression (16) is satisfied, the refractive power of first lens L1 is easily increased, and an angle of view is easily widened.

Here, regarding each of the aforementioned conditional expressions, it is desirable to satisfy a conditional expression in which an upper limit is added, or a lower limit is added, or a lower limit or an upper limit is modified, as will be described next, to improve the aforementioned action and effect. Further, a desirable mode may satisfy a conditional expression composed of a combination of a modified lower limit and a modified upper limit that will be described next. Next, desirable modification examples of conditional expressions will be described, as examples. However, the modification examples of conditional expressions are not limited to the following examples, represented by the expressions, but may be a combination of modified values described in the expressions.

It is more desirable that the upper limit of conditional expression (1) is 1.7, and 1.68 is even more desirable. It is desirable to set a lower limit for conditional expression (1). It is desirable that the lower limit is 1.5, and 1.55 is more desirable, and 1.58 is even more desirable. Then, the refractive index of third lens L3 is more easily increased, and the refractive power of third lens L3 is easily increased. Therefore, a longitudinal chromatic aberration is more easily corrected. As described above, it is more desirable, for example, that the following conditional expressions (1-1) through (1-3) are satisfied:

$$Nd3<1.7 \tag{1-1};$$

$$Nd3<1.68 \tag{1-2); or}$$

$$1.55<Nd3<1.7 \tag{1-3}.$$

It is desirable that the upper limit of conditional expression (2) is 26. Then, the Abbe number of the material of third lens L3 is more easily reduced, and a longitudinal chromatic aberration is more easily corrected. It is more desirable that the upper limit of conditional expression (2) is 25, and 24 is even more desirable. It is desirable to set a lower limit for conditional expression (2). It is desirable that the lower limit is 18, and 19 is more desirable. Then, the cost of the material of third lens L3 is easily suppressed, and the cost of the lens system is easily reduced. As described above, it is more desirable, for example, that the following conditional expressions (2-1) through (2-3) are satisfied:

$$vd3<26 \tag{2-1};$$

$$19<vd3<26 \tag{2-2); or}$$

$$vd3<25 \tag{2-3}.$$

It is desirable that the lower limit of conditional expression (3) is 1.05. Then, distortion is more easily corrected. It is more desirable that the lower limit of conditional expression (3) is 1.1, and 1.2 is even more desirable, and 1.3 is still more desirable. It is desirable to set an upper limit for conditional expression (3). It is desirable that the upper limit is 5.0. Then, the absolute value of the curvature radius of the object-side surface of first lens L1 and the absolute value of the curvature radius of the image-side surface of first lens L1 are easily prevented from becoming close to each other, and the refractive power of first lens L1 is easily increased. Therefore, an angle of view is easily widened. It is more desirable that the upper limit of conditional expression (3) is 3.5, and 2.6 is even more desirable. As described above, it is more desirable, for example, that the following conditional expressions (3-1) through (3-5) are satisfied:

$$1.05 \le (R1+R2)/(R1-R2) \tag{3-1};$$

$$1.1 \le (R1+R2)/(R1-R2) \tag{3-2};$$

$$1.2 \le (R1+R2)/(R1-R2) \tag{3-3);}$$

$$1.05 \le (R1+R2)/(R1-R2) \le 3.5 \tag{3-4); or}$$

$$1.1 \le (R1+R2)/(R1-R2) \le 2.6 \tag{3-5}.$$

It is desirable that the lower limit of conditional expression (4) is 0.02. Then, the absolute value of the curvature radius of the object-side surface of second lens L2 is more easily made greater than the absolute value of the curvature radius of the image-side surface of second lens L2, and distortion is more easily corrected. It is desirable to set an upper limit for conditional expression (4). It is desirable that the upper limit is 5.0. Then, it is possible to make second lens L2 a biconvex lens. Therefore, the refractive power of second lens L2 is easily increased, and curvature of field is easily corrected. It is more desirable that the upper limit of conditional expression (4) is 1.0, and 0.5 is even more desirable, and 0.3 is still more desirable. As described above, it is more desirable, for example, that the following conditional expressions (4-1) through (4-5) are satisfied:

$$0.0 \le (R3+R4)/(R3-R4)<5.0 \tag{4-1};$$

$$0.0 \le (R3+R4)/(R3-R4)<1.0 \tag{4-2};$$

$$0.0 \le (R3+R4)/(R3-R4)<0.5 \tag{4-3};$$

$$0.0 \le (R3+R4)/(R3-R4)<0.3 \tag{4-4); or}$$

$$0.02 \le (R3+R4)/(R3-R4)<1.0 \tag{4-5}.$$

It is desirable that the upper limit of conditional expression (5) is 1.48, and 1.45 is more desirable. Then, a combined focal length of first lens L1 and second lens L2 is more easily prevented from becoming a large positive value, and an angle of view is more easily widened. It is desirable to set a lower limit for conditional expression (5). It is desirable that the lower limit is 0.0. Then, the combined focal length of first lens L1 and second lens L2 is easily prevented from becoming short, and curvature of field is easily corrected. It is more desirable that the lower limit of conditional expression (5) is 0.5, and 1.0 is even more desirable, and 1.1 is still more desirable. As described above, it is more desirable, for example, that the following conditional expressions (5-1) through (5-4) are satisfied:

$$f12/f<1.48 \tag{5-1};$$

$$f12/f<1.45 \tag{5-2};$$

$$0.0<f12/f<1.5 \tag{5-3); or}$$

$$1.0<f12/f<1.48 \tag{5-4}.$$

It is desirable that the lower limit of conditional expression (6) is 0.5. Then, it is possible to more easily suppress the refractive power of first lens L1, and to condense light without sharply bending rays at the object-side surface of first lens L1. Therefore, distortion is more easily corrected. It is more desirable that the lower limit of conditional expression (6) is 1.0, and 1.2 is even more desirable, and 1.4 is still more desirable. It is desirable to set an upper limit for conditional expression (6). It is desirable that the upper limit is 100. Then, the curvature radius of the object-side surface of lens L1 is easily reduced, and rays entering this surface at a wide angle of view are easily prevented from being sharply bent at this surface, and distortion is more easily corrected. It is more desirable that the upper limit of conditional expression (6) is 60, and 20 is even more desirable, and 10 is still more desirable, and 5 is further more desirable. As described above, it is more desirable, for example, that the following conditional expressions (6-1) through (6-5) are satisfied:

$$0.5<R1/f \tag{6-1};$$

$$1.2<R1/f \tag{6-2};$$

$$1.4<R1/f \tag{6-3};$$

$$1.2<R1/f<5 \tag{6-4}$$

or $$0.5<R1/f<60 \tag{6-5}$$

It is desirable that the upper limit of conditional expression (7) is −0.7. Then, the refractive power of first lens L1 is easily suppressed, and curvature of field and distortion are more easily corrected. It is more desirable that the upper limit of conditional expression (7) is −0.8, and −0.9 is even more desirable, and −1.0 is still more desirable. It is desirable that the lower limit of conditional expression (7) is −2.7. Then, the refractive power of first lens L1 is more easily increased, and an angle of view is more easily widened. It is more desirable that the lower limit of conditional expression (7) is −2.5, and −2.0 is even more desirable. As described above, it is more desirable, for example, that the following conditional expressions (7-1) through (7-5) are satisfied:

$$-2.7<f1/f<-0.7 \tag{7-1}$$

$$-2.5<f1/f<-0.8 \tag{7-2}$$

$$-2.5<f1/f<-0.9 \tag{7-3}$$

$$-2.7<f1/f<-1.0 \tag{7-4}$$

and $$-2.0<f1/f<-0.8 \tag{7-5}$$

It is desirable that the upper limit of conditional expression (8) is 0.6. Then, the curvature radius of the object-side surface of fourth lens L4 is more easily suppressed, and a longitudinal chromatic aberration is more easily corrected. It is more desirable that the upper limit of conditional expression (8) is 0.5, and 0.4 is even more desirable. It is desirable that the lower limit of conditional expression (8) is −0.6. Then, the curvature radius of the image-side surface of fourth lens L4 is more easily suppressed, and curvature of field and a coma aberration are more easily corrected. It is more desirable that the lower limit of conditional expression (8) is −0.5, and −0.4 is even more desirable, and −0.3 is still more desirable. As described above, it is more desirable, for example, that the following conditional expressions (8-1) through (8-5) are satisfied:

$$-0.6<(R8+R9)/(R8-R9)<0.6 \tag{8-1}$$

$$-0.5<(R8+R9)/(R8-R9)<0.5 \tag{8-2}$$

$$-0.4<(R8+R9)/(R8-R9)<0.4 \tag{8-3}$$

$$-0.8<(R8+R9)/(R8-R9)<0.6 \tag{8-4}$$

or $$-0.6<(R8+R9)/(R8-R9)<0.8 \tag{8-5}$$

It is desirable that the upper limit of conditional expression (9) is −0.5. Then, the refractive power of fifth lens L5 is more easily suppressed, and a spherical aberration is more easily corrected, or a back focus is more easily secured. It is more desirable that the upper limit of conditional expression (9) is −0.6, and −0.7 is even more desirable. It is desirable that the lower limit of conditional expression (9) is −2.0. Then, the refractive power of fifth lens L5 is more easily increased, and a spherical aberration is more easily corrected, or an incident angle of peripheral rays entering an image plane is easily suppressed, and shading is more easily suppressed. It is more desirable that the lower limit of conditional expression (9) is −1.8, and −1.5 is even more desirable, and −1.3 is still more desirable. As described above, it is more desirable, for example, that the following conditional expressions (9-1) through (9-5) are satisfied:

$$-2.0<(R9+R10)/(R9-R10)<-0.5 \tag{9-1}$$

$$-1.8<(R9+R10)/(R9-R10)<-0.6 \tag{9-2}$$

$$-1.5<(R9+R10)/(R9-R10)<-0.7 \tag{9-3}$$

$$-2.0<(R9+R10)/(R9-R10)<-0.7 \tag{9-4}$$

or $$-1.3<(R9+R10)/(R9-R10)<-0.4 \tag{9-5}$$

It is desirable that the upper limit of conditional expression (10) is −0.3. Then, the refractive power of third lens L3 is more easily suppressed, and sensitivity to an error caused by eccentricity is more easily suppressed. It is more desirable that the upper limit of conditional expression (10) is −0.4. It is desirable that the lower limit of conditional expression (10) is −1.8. Then, the refractive power of third lens L3 is more easily increased, and a longitudinal chromatic aberration is more easily suppressed. It is more desirable that the lower limit of conditional expression (10) is −1.5, and −1.0 is even more desirable, and −0.9 is still more desirable. As described above, it is more desirable, for example, that the following conditional expressions (10-1) through (10-5) are satisfied:

$$-1.8<f3/f<-0.3 \tag{10-1}$$

$$-1.5<f3/f<-0.3 \tag{10-2}$$

$$-2.0<f3/f<-0.4 \tag{10-3}$$

$$-1.0<f3/f<-0.2 \tag{10-4}$$

or $$-1.5<f3/f<-0.4 \tag{10-5}$$

It is desirable that the upper limit of conditional expression (11) is 2.2. Then, the refractive power of fourth lens L4 is more easily increased, and a longitudinal chromatic aberration is more easily suppressed between third lens L3 and fourth lens L4. It is more desirable that the upper limit of conditional expression (11) is 2.0, and 1.8 is even more desirable. It is desirable that the lower limit of conditional expression (11) is 0.6. Then, the refractive power of fourth lens L4 is more easily suppressed, and positive refractive power is more easily divided between fourth lens L4 and fifth lens L5, and a spherical aberration is more easily corrected. It is more desirable that the lower limit of conditional expression (11) is 0.7, and 0.8 is even more desirable. As described above, it is more desirable, for example, that the following conditional expressions (11-1) through (11-5) are satisfied:

$$0.6<f4/f<2.2 \tag{11-1}$$

$$0.7<f4/f<2.0 \tag{11-2}$$

$$0.8<f4/f<1.8 \tag{11-3}$$

$$0.5<f4/f<2.2 \tag{11-4}$$

or $$0.6<f4/f<2.0 \tag{11-5}$$

It is desirable that the upper limit of conditional expression (12) is −0.5. Then, the combined refractive power of fourth lens L4 and fifth lens L5 is more easily increased, and the size of the system is more easily reduced, and an incident angle of peripheral rays entering an image plane is more easily suppressed. It is more desirable that the upper limit of conditional expression (12) is −0.6, and −0.7 is even more desirable, and −0.8 is still more desirable. It is desirable that the lower limit of conditional expression (12) is −3.0. Then, the refractive power of third lens L3 is more easily increased, and a longitudinal chromatic aberration is more easily corrected. It is more desirable that the lower limit of conditional expression (12) is −2.5, and −2.0 is even more desirable, and −1.5 is still more desirable. As described above, it is more desirable, for example, that the following conditional expressions (12-1) through (12-3) are satisfied:

$$-3.0<f45/f3<-0.5 \quad (12\text{-}1);$$

$$-2.5<f45/f3<-0.6 \quad (12\text{-}2);\text{ or}$$

$$-2.0<f45/f3<-0.7 \quad (12\text{-}3).$$

It is desirable that the upper limit of conditional expression (13) is 3.5. Then, it is possible to increase the combined refractive power of third lens L3 through fifth lens L5, and the size of the lens system is more easily reduced, or an incident angle of peripheral rays entering an image plane is more easily suppressed. It is more desirable that the upper limit of conditional expression (13) is 3.2, and 2.7 is even more desirable. It is desirable that the lower limit of conditional expression (13) is 0.7. Then, the combined refractive power of third lens L3 through fifth lens L5 is more easily prevented from becoming strong, and a back focus is more easily secured, and a longitudinal chromatic aberration is more easily corrected. It is more desirable that the lower limit of conditional expression (13) is 1.0, and 1.2 is even more desirable, and 1.5 is still more desirable. As described above, it is more desirable, for example, that the following conditional expressions (13-1) through (13-5) are satisfied:

$$0.7<f345/f<4.0 \quad (13\text{-}1);$$

$$1.2<f345/f<3.5 \quad (13\text{-}2);$$

$$1.5<f345/f<3.2 \quad (13\text{-}3);$$

$$0.7<f345/f<3.2 \quad (13\text{-}4);\text{ or}$$

$$1.0<f345/f<2.7 \quad (13\text{-}5).$$

It is desirable that the upper limit of conditional expression (14) is 2.0. Then, the combined refractive power of third lens L3 through fifth lens L5 is more easily prevented from becoming strong, and a back focus is more easily secured, or the combined refractive power of first lens L1 and second lens L2 is more easily increased, and curvature of field is easily corrected. It is more desirable that the upper limit of conditional expression (14) is 1.5, and 1.0 is even more desirable. It is desirable that the lower limit of conditional expression (14) is 0.3. Then, the combined refractive power of third lens L3 through fifth lens L5 is more easily increased, and the size of the lens system is more easily reduced, or an incident angle of peripheral rays entering an image plane is more easily suppressed. It is more desirable that the lower limit of conditional expression (14) is 0.4. As described above, it is more desirable, for example, that the following conditional expressions (14-1) through (14-4) are satisfied:

$$0.3<f12/f345<2.0 \quad (14\text{-}1);$$

$$0.4<f12/f345<2.0 \quad (14\text{-}2);$$

$$0.4<f12/f345<1.5 \quad (14\text{-}3);\text{ or}$$

$$0.3<f12/f345<1.0 \quad (14\text{-}4).$$

It is desirable that the upper limit of conditional expression (15) is 2.5. Then, the size of the lens system is more easily reduced. It is more desirable that the upper limit of conditional expression (15) is 2.1, and 1.8 is even more desirable. It is desirable that the lower limit of conditional expression (15) is 0.4. Then, the center thickness of second lens L2 is more easily increased, or a distance between second lens L2 and third lens L3 is more easily widened, and a spherical aberration and curvature of field are more easily corrected. It is more desirable that the lower limit of conditional expression (15) is 0.5, and 0.7 is even more desirable. As described above, it is more desirable, for example, that the following conditional expressions (15-1) through (15-4) are satisfied:

$$0.4<(DA+DB)/f<2.5 \quad (15\text{-}1);$$

$$0.5<(DA+DB)/f<2.1 \quad (15\text{-}2);$$

$$0.7<(DA+DB)/f<1.8 \quad (15\text{-}3);\text{ or}$$

$$0.4<(DA+DB)/f<2.1 \quad (15\text{-}4).$$

It is desirable that the upper limit of conditional expression (16) is −0.7. Then, the refractive power of second lens L2 is more easily increased, and a spherical aberration and curvature of field are more easily corrected, or the refractive power of first lens L1 is more easily prevented from becoming strong, and distortion is more easily corrected. It is more desirable that the upper limit of conditional expression (16) is −0.8, and −0.9 is even more desirable. It is desirable that the lower limit of conditional expression (16) is −2.5. Then, the refractive power of first lens L1 is more easily increased, and an angle of view is more easily widened. It is more desirable that the lower limit of conditional expression (16) is −2.3, and −2.1 is even more desirable. As described above, it is more desirable, for example, that the following conditional expressions (16-1) through (16-5) are satisfied:

$$-2.5<f1/f2<-0.7 \quad (16\text{-}1);$$

$$-2.3<f1/f2<-0.8 \quad (16\text{-}2);$$

$$-2.1<f1/f2<-0.9 \quad (16\text{-}3);$$

$$-2.3<f1/f2<-0.7 \quad (16\text{-}4);\text{ or}$$

$$-2.5<f1/f2<-0.8 \quad (16\text{-}5).$$

It is desirable that Abbe number vd1 of the material of first lens L1 for d-line is 40 or higher. Then, it is possible to excellently correct a longitudinal chromatic aberration and a lateral chromatic aberration. It is more desirable that Abbe number vd1 of the material of first lens L1 for d-line is 45 or higher, and 50 or higher is even more desirable.

It is desirable that Abbe number vd1 of the material of first lens L1 for d-line is 85 or lower. Then, the cost of the material of first lens L1 is easily suppressed. It is more desirable that Abbe number vd1 of the material of first lens L1 for d-line is 75 or lower.

It is desirable that Abbe number vd2 of the material of second lens L2 for d-line is 30 or higher. Then, it is possible to excellently correct a longitudinal chromatic aberration. It is more desirable that Abbe number vd2 of the material of second lens L2 for d-line is 35 or higher, and 38 or higher is even more desirable.

It is desirable that Abbe number vd2 of the material of second lens L2 for d-line is 60 or lower. Then, the cost of the material of second lens L2 is easily reduced, and a lateral chromatic aberration is easily corrected. It is more desirable that Abbe number vd2 of the material of second lens L2 for d-line is 55 or lower, and 50 or lower is even more desirable.

When the Abbe number of the material of first lens L1 for d-line is vd1, and the Abbe number of the material of second lens L2 for d-line is νd2, it is desirable that νd1/νd2 is 1.0 or greater. Then, Abbe number νd1 of the material of first lens L1 is easily increased, and a longitudinal chromatic aberration is easily corrected, or Abbe number νd2 of second lens L2 is easily prevented from becoming too high, and a lateral chromatic aberration is easily corrected. It is desirable that νd1/νd2 is 1.6 or less. Then, Abbe number νd2 of the material of second lens L2 is easily prevented from becoming too small, and a longitudinal chromatic aberration is easily corrected.

It is desirable that Abbe number νd3 of the material of third lens L3 for d-line is 27 or lower. Then, it is possible to excellently correct a longitudinal chromatic aberration. It is more desirable that Abbe number νd3 of the material of third lens L3 for d-line is 26 or lower, and 25 or lower is even more desirable.

It is desirable that Abbe number νd3 of the material of third lens L3 for d-line is 19 or higher. Then, the cost of the material of third lens L3 is easily suppressed, and the lens system is easily configured at low cost.

It is desirable that Abbe number νd4 of the material of fourth lens L4 for d-line is 40 or higher. Then, it is possible to excellently correct a longitudinal chromatic aberration and a lateral chromatic aberration. It is more desirable that Abbe number νd4 of the material of fourth lens L4 for d-line is 45 or higher, and 50 or higher is even more desirable.

It is desirable that Abbe number νd4 of the material of fourth lens L4 for d-line is 70 or lower. Then, the cost of the material of fourth lens L4 is easily suppressed, and the cost of the lens system is easily reduced. It is more desirable that Abbe number νd4 of the material of fourth lens L4 for d-line is 65 or lower, and 60 or lower is even more desirable.

It is desirable that Abbe number νd5 of the material of fifth lens L5 for d-line is 40 or higher. Then, it is possible to excellently correct a longitudinal chromatic aberration and a lateral chromatic aberration. It is more desirable that Abbe number νd5 of the material of fifth lens L5 for d-line is 45 or higher, and 50 or higher is even more desirable.

It is desirable that Abbe number νd5 of the material of fifth lens L5 for d-line is 70 or lower. Then, the cost of the material of fifth lens L5 is easily suppressed, and the cost of the lens system is easily reduced. It is more desirable that Abbe number νd5 of the material of fifth lens L5 for d-line is 65 or lower, and 60 or lower is even more desirable.

When the refractive index of a material constituting first lens L1 for d-line is Nd1, it is desirable that Nd1 is 1.5 or higher. Then, the refractive power of first lens L1 is easily increased, and an angle of view is easily widened. It is more desirable that Nd1 is 1.51 or higher, and 1.55 or higher is even more desirable.

When the refractive index of the material constituting first lens L1 for d-line is Nd1, it is desirable that Nd1 is 1.85 or lower. Then, the cost of the material of first lens L1 is easily reduced. It is more desirable that Nd1 is 1.82 or lower, and 1.80 or lower is even more desirable.

When the refractive index of a material constituting second lens L2 for d-line is Nd2, it is desirable that Nd2 is 1.70 or higher. Then, the refractive power of second lens L2 is easily increased, and curvature of field is easily corrected. It is more desirable that Nd2 is 1.72 or higher, and 1.75 or higher is even more desirable.

When the refractive index of the material constituting second lens L2 for d-line is Nd2, it is desirable that Nd2 is 1.95 or lower. Then, the cost of the material of second lens L2 is easily reduced. It is more desirable that Nd2 is 1.90 or lower.

When the refractive index of a material constituting fourth lens L4 for d-line is Nd4, it is desirable that Nd4 is 1.48 or higher. Then, the refractive power of fourth lens L4 is easily increased, and a spherical aberration and curvature of field are easily corrected. It is more desirable that Nd4 is 1.49 or higher, and 1.50 or higher is even more desirable.

When the refractive index of the material constituting fourth lens L4 for d-line is Nd4, it is desirable that Nd4 is 1.60 or lower. Then, the cost of the material of fourth lens L4 is easily reduced. It is more desirable that Nd4 is 1.58 or lower, and 1.55 or lower is even more desirable.

When the refractive index of a material constituting fifth lens L5 for d-line is Nd5, it is desirable that Nd5 is 1.48 or higher. Then, the refractive power of fifth lens L5 is easily increased, and a spherical aberration and curvature of field are easily corrected, and an incident angle of rays entering an imaging device is easily suppressed, and shading is easily suppressed.

An aperture stop is a stop determining the F-number (Fno) of a lens system. It is desirable that aperture stop St is arranged toward the object side of the image-side surface of fourth lens L4. When the aperture stop is arranged toward the object side of the image-side surface of fourth lens L4, the diameter of an aperture of first lens L1 is easily reduced, and the size of the lens diameter is easily reduced. For example, when a lens is applied to an in-vehicle camera, a portion of the lens exposed to the outside of a car needs to be small so as not to damage the outward appearance of the car. When aperture stop St is arranged toward the object side of fourth lens L4, the aperture diameter of first lens L1 is easily reduced, and a portion of the lens exposed to the outside is easily reduced. Further, an incident angle of rays entering an imaging device is easily suppressed, and shading is easily suppressed.

It is desirable that aperture stop St is arranged toward the object side of the image-side surface of third lens L3. Then, the aperture diameter of first lens L1 is easily reduced more.

It is desirable that aperture stop St is arranged toward the image side of the object-side surface of second lens L2. Then, the lens diameter of fifth lens L5 is easily reduced.

It is desirable that aperture stop St is arranged between the object-side surface of third lens L3 and the object-side surface of second lens L2. Then, the lens diameters of first lens L1 through fifth lens L5 are easily balanced with each other, and the diameter of the entire lens is easily reduced.

It is desirable that at least one of the surfaces of first lens L1 through fifth lens L5 is an aspheric surface. Then, it is possible to excellently correct various aberrations.

It is desirable that at least one of the surfaces of third lens L3 is an aspheric surface. When at least one of the surfaces of third lens L3 is an aspheric surface, curvature of field and a spherical aberration are easily corrected, and excellent resolution performance is achievable. It is more desirable that both of the surfaces of third lens L3 are aspheric surfaces.

It is desirable that the image-side surface of third lens L3 is an aspheric surface. It is desirable that the image-side surface of third lens L3 has negative refractive power both at a center and at an effective diameter edge, and is shaped in such a manner that the negative refractive power at the effective diameter edge is weaker, compared with the negative refractive power at the center. When third lens L3 has such a shape, curvature of field and a spherical aberration are easily corrected.

The phrase "effective diameter of a surface" means the diameter of a circle composed of outermost points (points farthest from an optical axis) in the direction of the diameter when points at which all rays contributing to image formation and a lens surface intersect with each other are considered. The term "effective diameter edge" means these outermost points. Here, when a system is rotationally symmetrical with respect to an optical axis, a figure composed of the outermost points is a circle. However, when the system is not rotationally symmetrical, the figure is not a circle in some cases. In such a case, an equivalent circle may be considered, and the diameter of the circle may be used as the effective diameter.

Regarding the shape of an aspheric surface, when a point on lens surface i of each lens is Xi (the sign of i represents a corresponding lens surface. For example, when the image-side surface of third lens L3 is represented by 7, the sign of i may be regarded as i=7 in the following explanation about the image-side surface of third lens L3), and an intersection of a normal at the point and an optical axis is Pi, the length of Xi-Pi (|Xi-Pi|) is defined as the absolute value |RXi| of a curvature radius at point Xi, and Pi is defined as the center of a curvature at point Xi. Further, an intersection of the i-th lens surface and the optical axis is Qi. At this time, refractive power at point Xi is defined based on whether point Pi is located toward the object side of point Qi or toward the image side of point Qi. Regarding the object-side surface, the refractive power is defined as positive refractive power when point Pi is located toward the image side of point Qi, and the refractive power is defined as negative refractive power when point Pi is located toward the object side of point Qi. Regarding the image-side surface, the refractive power is defined as positive refractive power when point Pi is located toward the object side of point Qi, and the refractive power is defined as negative refractive power when point Pi is located toward the image side of point Qi.

When refractive power at a center and refractive power at point Xi are compared with each other, the absolute value of a curvature radius at the center (a paraxial curvature radius) and the absolute value |RXi| of a curvature radius at point Xi are compared with each other. When |RXi| is smaller than the absolute value of the paraxial curvature radius, the refractive power at point Xi is judged to be stronger, compared with the refractive power at the center. In contrast, when |RXi| is greater than the absolute value of the paraxial curvature radius, the refractive power at point Xi is judged to be weaker, compared with the refractive power at the center. This is the same for both of a case in which a surface has positive refractive power and a case in which a surface has negative refractive power.

Figure 2:
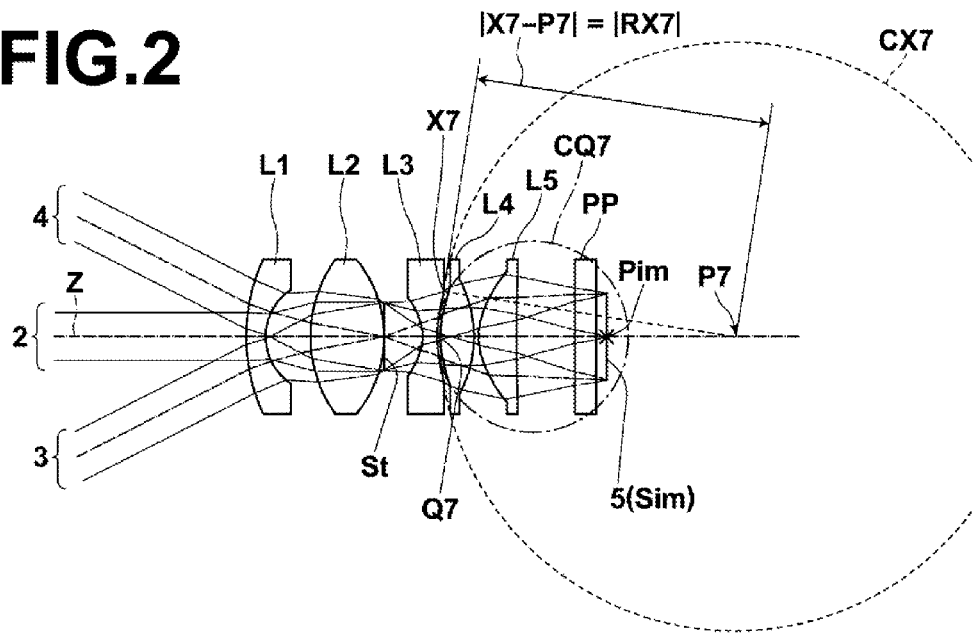

Here, with reference to FIG. 2, the shape of the image-side surface of third lens L3 will be described. FIG. 2 is an optical path diagram of the imaging lens 1 illustrated in FIG. 1. In FIG. 2, point Q7 is a center of the image-side surface of third lens L3, which is an intersection of the image-side surface of third lens L3 and optical axis Z. In FIG. 2, point X7 on the image-side surface of third lens L3 is located at an effective diameter edge, and point X7 is an intersection of an outermost ray included in off-axial rays 3 and the image-side surface of third lens L3. In FIG. 2, point X7 is located at the effective diameter edge. However, point X7 is an arbitrary point on the image-side surface of third lens L3. Therefore, even if point X7 is a different point, point X7 may be considered in the same manner.

At this time, an intersection of a normal to the lens surface at point X7 and optical axis Z is P7, as illustrated in FIG. 2, and the segment X7-P7, which connects point X7 and point P7 to each other, is defined as curvature radius RX7 at point X7, and the length |X7-P7| of the segment X7-P7 is defined as the absolute value |RX7| of curvature radius RX7. In other words, |X7-P7|=|RX7|. Further, a curvature radius at point Q7, in other words, a curvature radius at the center of the image-side surface of third lens L3 is R7, and the absolute value of the curvature radius is |R7| (not illustrated in FIG. 2).

The expression that the image-side surface of third lens L3 "has negative refractive power both at a center and at an effective diameter edge, and is shaped in such a manner that the negative refractive power at the effective diameter edge is weaker, compared with the negative refractive power at the center" means a shape in which when point X7 is located at an effective diameter edge, a paraxial region including point Q7 is concave, and point P7 is located toward the image side of point Q7, and the absolute value |RX7| of the curvature radius at point X7 is greater than the absolute value |R7| of the curvature radius at point Q7.

For the purpose of facilitating understanding, in FIG. 2, circle CQ7, which passes through point Q7 at the radius of |R7| with its center located on the optical axis, is drawn with a dot dashed line. Further, a part of circle CX7, which passes through point X7 at the radius of |RX7| with its center located on the optical axis, is drawn by a broken line. Circle CX7 is larger than circle CQ7, and |R7|<|RX7| is clearly illustrated.

It is desirable that the object-side surface of third lens L3 is an aspheric surface. It is desirable that the object-side surface of third lens L3 has negative refractive power both at a center and at an effective diameter edge, and is shaped in such a manner that the negative refractive power at the effective diameter edge is weaker, compared with the negative refractive power at the center. When the object-side surface of third lens L3 has such a shape, curvature of field is easily corrected.

The shape of the object-side surface of third lens L3 may be considered in the following manner similar to the shape of the image-side surface of third lens L3, explained using FIG. 2. In a sectional diagram of the lens, when a point on the object-side surface of third lens L3 is X6, and an intersection of a normal at the point and optical axis Z is P6, the segment X6-P6, which connects point X6 and point P6 to each other, is defined as a curvature radius at point X6, and the length |X6-P6| of the segment connecting point X6 and point P6 to each other is defined as the absolute value |RX6| of the curvature radius at point X6. Therefore, |X6-P6|=|RX6|. Further, an intersection of the object-side surface of third lens L3 and optical axis Z, in other words, a center of the object-side surface of third lens L3 is point Q6, and the absolute value of a curvature radius at point Q6 is |R6|.

The expression that the object-side surface of third lens L3 "has negative refractive power both at a center and at an effective diameter edge, and is shaped in such a manner that the negative refractive power at the effective diameter edge is weaker, compared with the negative refractive power at the center" means a shape in which when point X6 is located at an effective diameter edge, a paraxial region including point Q6 is concave, and point P6 is located toward the object side of point Q6, and the absolute value |RX6| of the curvature radius at point X6 is greater than the absolute value |R6| of the curvature radius at point Q6.

It is desirable that at least one of the surfaces of fourth lens L4 is an aspheric surface. When at least one of the surfaces of fourth lens L4 is an aspheric surface, curvature of field and a spherical aberration are easily corrected, and excellent resolution performance is achievable. It is more desirable that both of the surfaces of fourth lens L4 are aspheric surfaces.

It is desirable that the image-side surface of fourth lens L4 is an aspheric surface. It is desirable that the image-side surface of fourth lens L4 has positive refractive power both at a center and at an effective diameter edge, and is shaped in such a manner that the positive refractive power at the effective diameter edge is stronger, compared with the positive refractive power at the center. When fourth lens L4 has such a shape, it is possible to excellently correct a spherical aberration and curvature of field.

The shape of the image-side surface of fourth lens L4 may be considered in the following manner similar to the shape of the image-side surface of third lens L3, explained using FIG. 2. In a sectional diagram of the lens, when a point on the image-side surface of fourth lens L4 is X9, and an intersection of a normal at the point and optical axis Z is P9, the segment X9-P9, which connects point X9 and point P9 to each other, is defined as a curvature radius at point X9, and the length |X9-P9| of the segment connecting point X9 and point P9 to each other is defined as the absolute value |RX9| of the curvature radius at point X9. Therefore, |X9-P9|=|RX9|. Further, an intersection of the image-side surface of fourth lens L4 and optical axis Z, in other words, a center of the image-side surface of fourth lens L4 is point Q9, and the absolute value of a curvature radius at point Q9 is |R9|.

The expression that the image-side surface of fourth lens L4 "has positive refractive power both at a center and at an effective diameter edge, and is shaped in such a manner that the positive refractive power at the effective diameter edge is stronger, compared with the positive refractive power at the center" means a shape in which when point X9 is located at an effective diameter edge, a paraxial region including point Q9 is convex, and point P9 is located toward the object side of point Q9, and the absolute value |RX9| of the curvature radius at point X9 is smaller than the absolute value |R9| of the curvature radius at point Q9.

It is desirable that the object-side surface of fourth lens L4 is an aspheric surface. It is desirable that the object-side surface of fourth lens L4 has positive refractive power both at a center and at an effective diameter edge, and is shaped in such a manner that the positive refractive power at the effective diameter edge is weaker, compared with the positive refractive power at the center. When fourth lens L4 has such a shape, a spherical aberration and curvature of field are easily corrected.

The shape of the object-side surface of fourth lens L4 may be considered in the following manner similar to the shape of the image-side surface of third lens L3, explained using FIG. 2. In a sectional diagram of the lens, when a point on the object-side surface of fourth lens L4 is X8, and an intersection of a normal at the point and optical axis Z is P8, the segment X8-P8, which connects point X8 and point P8 to each other, is defined as a curvature radius at point X8, and the length |X8-P8| of the segment connecting point X8 and point P8 to each other is defined as the absolute value |RX8| of the curvature radius at point X8. Therefore, |X8-P8|=|RX8|. Further, an intersection of the object-side surface of fourth lens L4 and optical axis Z, in other words, a center of the object-side surface of fourth lens L4 is point Q8, and the absolute value of a curvature radius at point Q8 is |R8|.

The expression that the object-side surface of fourth lens L4 "has positive refractive power both at a center and at an effective diameter edge, and is shaped in such a manner that the positive refractive power at the effective diameter edge is weaker, compared with the positive refractive power at the center" means a shape in which when point X8 is located at an effective diameter edge, a paraxial region including point Q8 is convex, and point P8 is located toward the image side of point Q8, and the absolute value |RX8| of the curvature radius at point X8 is greater than the absolute value |R8| of the curvature radius at point Q8.

It is desirable that at least one of the surfaces of fifth lens L5 is an aspheric surface. When at least one of the surfaces of fifth lens L5 is an aspheric surface, curvature of field and a spherical aberration are easily corrected, and excellent resolution performance is achievable. It is more desirable that both of the surfaces of fifth lens L5 are aspheric surfaces.

It is desirable that the image-side surface of fifth lens L5 is an aspheric surface. It is desirable that the image-side surface of fifth lens L5 has negative refractive power both at a center and at an effective diameter edge, and is shaped in such a manner that the negative refractive power at the effective diameter edge is weaker, compared with the negative refractive power at the center. When fifth lens L5 has such a shape, excellent correction of a spherical aberration and curvature of field is easy.

The shape of the image-side surface of fifth lens L5 may be considered in the following manner similar to the shape of the image-side surface of third lens L3, explained using FIG. 2. In a sectional diagram of the lens, when a point on the image-side surface of fifth lens L5 is X11, and an intersection of a normal at the point and optical axis Z is P11, the segment X11-P11, which connects point X11 and point P11 to each other, is defined as a curvature radius at point X11, and the length |X11-P11| of the segment connecting point X11 and point P11 to each other is defined as the absolute value |RX11| of the curvature radius at point X11. Therefore, |X11-P11|=|RX11|. Further, an intersection of the image-side surface of fifth lens L5 and optical axis Z, in other words, a center of the image-side surface of fifth lens L5 is point Q11, and the absolute value of a curvature radius at point Q11 is |R11|.

The expression that the image-side surface of fifth lens L5 "has negative refractive power both at a center and at an effective diameter edge, and is shaped in such a manner that the negative refractive power at the effective diameter edge is weaker, compared with the negative refractive power at the center" means a shape in which when point X11 is located at an effective diameter edge, a paraxial region including point Q11 is concave, and point P11 is located toward the image side of point Q11, and the absolute value |RX11| of the curvature radius at point X11 is greater than the absolute value |R11| of the curvature radius at point Q11.

It is desirable that the object-side surface of fifth lens L5 is an aspheric surface. It is desirable that the object-side surface of fifth lens L5 has positive refractive power both at a center and at an effective diameter edge, and is shaped in such a manner that the positive refractive power at the effective diameter edge is weaker, compared with the positive refractive power at the center. When fifth lens L5 has such a shape, excellent correction of a coma aberration and curvature of field is easy.

The shape of the object-side surface of fifth lens L5 may be considered in the following manner similar to the shape of the image-side surface of third lens L3, explained using FIG. 2. In a sectional diagram of the lens, when a point on the object-side surface of fifth lens L5 is X10, and an intersection of a normal at the point and optical axis Z is P10, the segment X10-P10, which connects point X10 and point P10 to each other, is defined as a curvature radius at point X10, and the length |X10-P10| of the segment connecting point X10 and point P10 to each other is defined as the absolute value |RX10| of the curvature radius at point X10. Therefore, |X10-P10|=|RX10|. Further, an intersection of the object-side surface of fifth lens L5 and optical axis Z, in other words, a center of the object-side surface of fifth lens L5 is point Q10, and the absolute value of a curvature radius at point Q10 is |R10|.

The expression that the object-side surface of fifth lens L5 "has positive refractive power both at a center and at an effective diameter edge, and is shaped in such a manner that the positive refractive power at the effective diameter edge is weaker, compared with the positive refractive power at the center" means a shape in which when point X10 is located at an effective diameter edge, a paraxial region including point Q10 is convex, and point P10 is located toward the image side of point Q10, and the absolute value |RX10| of the curvature radius at point X10 is greater than the absolute value |R10| of the curvature radius at point Q10.

It is desirable that first lens L1 has a convex surface facing the object side. Since first lens L1 has negative refractive power, when the object-side surface is convex, it is possible to make first lens L1 a meniscus lens. Consequently, distortion is easily corrected.

It is desirable that the image-side surface of first lens L1 is concave. When the image-side surface of first lens L1 is concave, an angle of view is easily widened.

It is desirable that first lens L1 is a meniscus lens with its convex surface facing the object side. Consequently, distortion is easily corrected.

It is desirable that the object-side surface of second lens L2 is convex. Then, the refractive power of second lens L2 is easily increased, and curvature of field is easily corrected.

It is desirable that the image-side surface of second lens L2 is convex. Then, the refractive power of second lens L2 is easily increased, and curvature of field is easily corrected.

It is desirable that second lens L2 is a biconvex lens. Then, the refractive power of second lens L2 is easily increased, and curvature of field is easily corrected.

It is desirable that the absolute value of the curvature radius of the object-side surface of second lens L2 is greater than the absolute value of the curvature radius of the image-side surface of second lens L2. Then, distortion is easily corrected.

It is desirable that the object-side surface of third lens L3 is concave. Then, the refractive power of third lens L3 is easily increased, and a longitudinal chromatic aberration is easily corrected.

It is desirable that the image-side surface of third lens L3 is concave. Then, the refractive power of third lens L3 is easily increased, and a longitudinal chromatic aberration is easily corrected.

It is desirable that third lens L3 is a biconcave lens. Then, the refractive power of third lens L3 is easily increased, and a longitudinal chromatic aberration is easily corrected.

It is desirable that the absolute value of the curvature radius of the object-side surface of third lens L3 is smaller than the absolute value of the curvature radius of the image-side surface of third lens L3. Then, curvature of field is easily corrected.

It is desirable that the object-side surface of fourth lens L4 is convex. Then, the refractive power of fourth lens L4 is easily increased, and a spherical aberration and curvature of field are easily corrected.

It is desirable that the image-side surface of fourth lens L4 is convex. Then, the refractive power of fourth lens L4 is easily increased, and a spherical aberration and curvature of field are easily corrected.

It is desirable that fourth lens L4 is a biconvex lens. Then, the refractive power of fourth lens L4 is easily increased, and a spherical aberration and curvature of field are easily corrected.

Fourth lens L4 may be a plano-convex lens with its convex surface facing the image side.

It is desirable that the object-side surface of fifth lens L5 is convex. Then, the refractive power of fifth lens L5 is easily increased, and a spherical aberration is easily corrected. Further, an incident angle of rays entering an imaging device is easily suppressed, and shading is easily suppressed.

It is desirable that the image-side surface of fifth lens L5 is a convex surface or a flat surface. Then, a spherical aberration is easily corrected. Further, an incident angle of rays entering an imaging device is easily suppressed, and shading is easily suppressed.

It is desirable that the image-side surface of fifth lens L5 is concave. Then, curvature of field is easily corrected.

It is desirable that fifth lens L5 is a biconvex lens or a plano-convex lens with its convex surface facing the object side. Then, the refractive power of fifth lens L5 is easily increased, and a spherical aberration is easily corrected. Further, an incident angle of rays entering an imaging device is easily suppressed, and shading is easily suppressed.

It is desirable that fifth lens L5 is a meniscus lens with its convex surface facing the object side. Then, curvature of field is easily corrected.

It is desirable that first lens L1 has negative refractive power, second lens L2 has positive refractive power, third lens L3 has negative refractive power, and fourth lens L4 and fifth lens L5 have positive refractive power. Then, negative refractive power, positive refractive power, negative refractive power and positive refractive power are arranged in order from the object side, because first lens L1 has negative refractive power, second lens L2 has positive refractive power, third lens L3 has negative refractive power, and fourth lens L4 and fifth lens L5 have positive refractive power. Therefore, first lens L1 and second lens L2 have a combination of negative refractive power and positive refractive power, and third lens L3 through fifth lens L5 have a combination of negative refractive power and positive refractive power. Consequently, an aberration generated in each lens is cancelled out, and excellent resolution performance is easily achievable. Further, since two lenses of fourth lens L4 and fifth lens L5 constitute the last lenses having "positive" refractive power among the lens having negative refractive power, the lens having positive refractive power, the lens having negative refractive power and the last lenses having positive refractive power, a spherical aberration is easily corrected.

It is desirable that the material of first lens L1 is glass. When an imaging lens is used in tough environment conditions, for example, such as use in an in-vehicle camera or a surveillance camera, first lens L1, which is arranged closest to the object side, needs to use a material resistant to a deterioration of surface by wind and rain and a change in temperature by direct sun light, and also resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material is glass, it is possible to satisfy such needs. Alternatively, transparent ceramic may be used as the material of first lens L1.

Further, a protection means for increasing the strength, scratch-resistance, and chemical-resistance may be applied to the object-side surface of first lens L1. In that case, the material of first lens L1 may be plastic. Such a protection means may be a hard coating or a water-repellent coating.

It is desirable that all of the lenses are made of glass to produce an optical system having excellent environment-resistance. When the optical system is used as a lens for a surveillance camera or a lens for an in-vehicle camera, the optical system may be used in various conditions, such as a wide temperature range from a high temperature to a low temperature and high humidity. It is desirable that all of the lenses are made of glass to produce an optical system having strong resistance to them.

It is desirable that the material of second lens L2 is glass. When glass is used as the material of second lens L2, material having a high refractive index is easily used, and the refractive power of second lens L2 is easily increased. Therefore, curvature of field is easily corrected. Further, when plastic is used as the material of third lens L3 through fifth lens L5, a shift in focus caused by a change in temperature is easily suppressed by using glass as the material of second lens L2, which is a convex lens.

It is desirable that the material of one of first lens L1 to fifth lens L5 or a combination of arbitrary plural lenses of them is plastic. When the material is plastic, the cost of the lens system is easily reduced, and the weight of the lens system is easily reduced. Further, it is possible to accurately produce an aspheric shape at low cost. Therefore, it is possible to excellently correct a spherical aberration and curvature of field.

It is desirable that a lens system includes a plastic lens having positive refractive power and a plastic lens having negative refractive power to produce a lens system resistant to a change in temperature. Generally, properties of a plastic lens greatly change by a change in temperature, and consequently, a shift in focus occurs. However, when the lens system includes a plastic lens having positive refractive power and a plastic lens having negative refractive power, changes in refractive power are cancelled out, and it is possible to minimize a deterioration in performance.

As the material of plastic, for example, acrylic, polyolefin-based material, polycarbonate-based material, epoxy resin, PET (Polyethylene terephthalate), PES (Poly Ether Sulphone), polycarbonate, and the like may be used.

Further, a filter that cuts ultraviolet light to blue light, or an IR (InfraRed) cut filter, which cuts infrared light, may be inserted between the lens system and the imaging device 5 based on the purpose of the imaging lens 1. Alternatively, a coating having a function similar to the filter may be applied to a lens surface, or a material that absorbs ultraviolet light, blue light, infrared light or the like may be used as the material of one of the lenses.

FIG. 1 illustrates a case of arranging optical member PP, which is assumed to be various filters or the like, between a lens system and the imaging device 5. Alternatively, the various filters may be arranged between the lenses, or a coating having an action similar to various filters may be applied a lens surface of one of the lenses included in the imaging lens.

Here, rays of light passing through the outside of the effective diameter between lenses may become stray light, and reach the image plane, and the stray light may become ghost. Therefore, it is desirable that a light shield means for blocking the stray light is provided, if necessary. The light shield means may be provided, for example, by applying an opaque paint to a portion of a lens in the outside of the effective diameter, or by providing there an opaque plate member. Alternatively, an opaque plate member, as a light shield means, may be provided in the optical path of rays that will become stray light. Alternatively, a hood-like member for blocking stray light may be provided further toward the object side of the lens closest to the object side. As an example, FIG. 1 illustrates an example in which light shield means 11, 12, 13 and 14 are provided in the outside of the effective diameter on the image-side surfaces of first lens L1, third lens L3 and fourth lens L4 and the object-side surface of fifth lens L5, respectively. The positions at which the light shield means are provided are not limited to the example illustrated in FIG. 1. The light shield means may be arranged on other lenses or between lenses.

Further, a member, such as a stop, which blocks peripheral rays in such a manner that relative illumination remains within a practically acceptable range may be arranged between lenses. The peripheral rays are rays from an object point that is not on optical axis Z, and pass through a peripheral portion of an entrance pupil of an optical system. When a member that blocks the peripheral rays is provided in this manner, it is possible to improve the image quality in the peripheral portion of the image formation area. Further, ghost is reducible by blocking, by this member, light that will generate ghost.

Further, it is desirable that the lens system consists of only five lenses of first lens L1, second lens L2, third lens L3, fourth lens L4 and fifth lens L5. When the lens system consists of only five lenses, the cost of the lens system is reducible.

An imaging apparatus according to an embodiment of the present disclosure includes an imaging lens according to an embodiment of the present disclosure. Therefore, the imaging apparatus is configurable in small size and at low cost, and has a sufficiently wide angle of view, and excellent images with high resolution are obtainable by using an imaging device.

Further, images imaged by imaging apparatuses including the imaging lenses according to the first through third embodiments may be displayed on cellular phones. For example, an imaging apparatus including an imaging lens according to an embodiment of the present disclosure is installed in a car, as an in-vehicle camera, and a rear or surrounding area of the car is imaged by the in-vehicle camera, and images obtained by imaging are displayed on a display device in some cases. In such cases, if a car navigation system (hereinafter, referred to as a car navigation) is installed in a car, images obtained by imaging may be displayed on a display device of the car navigation. However, if no car navigation is installed, a specialized display device, such as a liquid crystal display, needs to be set in the car. However, a display device is expensive. Meanwhile, a high performance display device, on which dynamic images and Web pages are viewable or the like, is mounted on a cellular phone in recent years. When the cellular phone is used as a display device for an in-vehicle camera, even if no car navigation is installed in the car, it is not necessary to install a specialized display device. Consequently, it is possible to install the in-vehicle camera at low cost.

Here, an image imaged by an in-vehicle camera may be sent to a cellular phone through a wire by using a cable or the like. Alternatively, the image may be sent to the cellular phone wirelessly by infrared ray communication or the like. Further, a cellular phone or the like and the operation state of a car may be linked with each other. When the car is switched into reverse gear, or a directional indicator is operated, or the like, an image imaged by the in-vehicle camera may be automatically displayed on the display device of the cellular phone.

The display device on which an image imaged by the in-vehicle camera is displayed is not limited to the cellular phone, but may be a mobile information terminal, such as a PDA, a small personal computer, or a portable small car navigation.

Further, a cellular phone on which an imaging lens of the present disclosure is mounted may be fixed in a car, and used as an in-vehicle camera. Smart phones of recent years have processing performance similar to the performance of a PC. Therefore, a camera of a cellular phone is usable in a similar manner to an in-vehicle camera, for example, by fixing the cellular phone onto a dashboard or the like of the car, and by directing the camera forward. Further, a function for issuing a warning by recognizing white lines and road signs may be provided as an application of a smart phone. Further, a camera may be directed to a driver, and used as a system for issuing a warning when the driver has fallen asleep or looked aside. Alternatively, the cellular phone may be linked with a car, and used as a part of a system for operating a steering wheel. Since a car is kept in a high temperature environment and a low temperature environment, an in-vehicle camera requires strong environment-resistance. When the imaging lens of the present disclosure is mounted on a cellular phone, the cellular phone is taken out from the car and carried by the driver while the car is not driven. Therefore, the environment-resistance of the imaging lens may be lowered. Consequently, it is possible to introduce an in-vehicle system at low cost.

[Numerical Value Examples of Imaging Lens]

Next, numerical value examples of imaging lenses of the present disclosure will be described. FIG. 3 through FIG. 15 illustrate lens cross sections of imaging lenses of Example 1 through Example 13, respectively. In FIG. 3 through FIG. 15, the left side of the diagram is the object side, and the right side of the diagram is the image side. Further, aperture stop St, optical member PP, and an imaging device 5 arranged at image plane Sim are also illustrated in a similar manner to FIG. 1. In each of the diagrams, aperture stop St does not represent the shape nor the size of the aperture stop, but the position of the aperture stop on optical axis Z. In each example, signs Ri, Di (i=1, 2, 3, . . . ) in the lens cross section correspond to Ri, Di in lens data, which will be described next.

Table 1 through Table 13 show lens data about the imaging lenses of Example 1 through Example 13, respectively. In each table, (A) shows basic lens data, and (B) shows various data, and (C) shows aspherical data.

In the basic lens data, column Si shows the surface number of the i-th surface (i=1, 2, 3, . . . ). The object-side surface of a composition element closest to the object side is the first surface, and surface numbers sequentially increase toward the image side. Column Ri shows the curvature radius of the i-th surface, and column Di shows a distance between the i-th surface and the (i+1)th surface on optical axis Z. Here, the sign of a curvature radius is positive when the shape of a surface is convex toward the object side, and the sign of a curvature radius is negative when the shape of a surface is convex toward the image side. Further, column Ndj shows the refractive index of the j-th optical member (j=1, 2, 3, . . . ) for d-line (wavelength is 587.6 nm). A lens closest to the object side is the first optical member, and the number of j sequentially increases toward the image side. The column vdj shows the Abbe number of the j-th optical element for d-line. Here, the basic lens data include aperture stop St and optical member PP. In the column of surface number, the term (St) is also written for a row of a surface corresponding to aperture stop St. Further, an imaging surface is represented by IMG.

In the basic lens data, mark "*" is attached to the surface number of an aspheric surface. The basic lens data show, as the curvature radius of an aspheric surface, the numerical value of a paraxial curvature radius (a curvature radius at the center). The aspherical data show the surface numbers of aspheric surfaces and aspherical coefficients related to the respective aspheric surfaces. In the numerical values of aspherical data, "E−n" (n: integer) means "×10$^{-n}$", and "E+n" means "×10$^{n}$". Further, the aspherical coefficients are coefficients KA, RBm (m=3, 4, 5, . . . 20) in an aspherical expression represented by the following equation:

$$Zd = C \cdot h^2 / \{1 + (1 - KA \cdot C^2 \cdot h^2)^{1/2}\} + \Sigma RBm \cdot h^m, \text{ where}$$

Zd: depth of an aspheric surface (the length of a perpendicular from a point on the aspheric surface at height h to a flat plane that contacts with the vertex of the aspheric surface and is perpendicular to an optical axis), h: height (a length from the optical axis to a lens surface), C: the reciprocal of a paraxial curvature radius, and KA, RBm: aspherical coefficients (m=3, 4, 5, . . . 20).

In various kinds of data, L (in Air) is a length (a back focus portion is an air equivalent length) on optical axis Z from the object-side surface of first lens L1 to image plane Sim, and Bf (in Air) is a length (corresponding to a back focus, an air equivalent length) on optical axis Z from the image-side surface of a lens closest to the image side to image plane Sim, and f is the focal length of the entire system, and f1 is the focal length of first lens L1, and f2 is the focal length of second lens L2, and f3 is the focal length of third lens L3, and f4 is the focal length of fourth lens L4, and f5 is the focal length of fifth lens L5, and f12 is a combined focal length of first lens L1 and second lens L2, and f45 is a combined focal length of fourth lens L4 and fifth lens L5, and f345 is a combined focal length of third lens L3, fourth lens L4 and fifth lens L5.

Further, Tables 14 and 15 show values corresponding to conditional expressions (1) through (16) of each of the examples together. Here, conditional expression (1) is Nd3, and conditional expression (2) is vd3, and conditional expression (3) is (R1+R2)/(R1−R2), and conditional expression (4) is (R3+R4)/(R3−R4), and conditional expression (5) is f12/f, and conditional expression (6) is R1/f, and conditional expression (7) is f1/f, and conditional expression (8) is (R8+R9)/(R8−R9), and conditional expression (9) is (R10+R11)/(R10−R11), and conditional expression (10) is f3/f, and conditional expression (11) is f4/f, and conditional expression (12) is f45/f3, and conditional expression (13) is f345/f, and conditional expression (14) is f12/f345, and conditional expression (15) is (DA+DB)/f, and conditional expression (16) is f1/f2, where L is a length (a back focus portion is an air equivalent length) from the vertex of the object-side surface of first lens L1 to an image plane, Bf is a length (an air equivalent length) from the vertex of the image-side surface of fifth lens L5 to the image plane, f is a focal length of an entire system, f1 is a focal length of first lens L1, f2 is a focal length of second lens L2, f3 is a focal length of third lens L3, f4 is a focal length of fourth lens L4, f12 is a combined focal length of first lens L1 and second lens L2, f45 is a combined focal length of fourth lens L4 and fifth lens L5, f345 is a combined focal length of third lens L3, fourth lens L4 and fifth lens L5, R1 is a curvature radius of an object-side surface of first lens L1, R2 is a curvature radius of an image-side surface of first lens L1, R3 is a curvature radius of an object-side surface of second lens L2, R4 is a curvature radius of an image-side surface of second lens L2, R8 is a curvature radius of an object-side surface of fourth lens L4, R9 is a curvature radius of an image-side surface of fourth lens L4, R10 is a curvature radius of an object-side surface of fifth lens L5, R11 is a curvature radius of an image-side surface of fifth lens L5, DA is a center thickness of second lens L2, and DB is an air space between second lens L2 and third lens L3.

As the unit of each numerical value, "mm" is used for length. However, this unit is only an example. Since an optical system is usable by being proportionally enlarged or proportionally reduced in size, other appropriate units may be used.

TABLE 1

EXAMPLE 1

(A)

| Si | Ri | Di | Ndj | vdj |
|---|---|---|---|---|
| 1 | 9.5514 | 1.0000 | 1.75500 | 52.3 |
| 2 | 2.9077 | 2.3634 | | |
| 3 | 6.9456 | 3.8000 | 1.83481 | 42.7 |
| 4 | −6.3100 | −0.0001 | | |
| 5(St) | ∞ | 1.9999 | | |
| *6 | −2.4487 | 0.7500 | 1.63360 | 23.6 |
| *7 | 4.9590 | 0.1571 | | |
| *8 | 4.1940 | 1.7564 | 1.53156 | 55.1 |
| *9 | −6.2562 | 0.2276 | | |
| *10 | 3.1686 | 2.0000 | 1.53156 | 55.1 |
| *11 | 138.7569 | 3.0000 | | |
| 12 | ∞ | 1.1000 | 1.51680 | 64.2 |
| 13 | ∞ | 0.5551 | | |
| IMG | | | | |

(B)

| | |
|---|---|
| L(in Air) | 18.34 |
| Bf(in Air) | 4.28 |
| f | 4.72 |
| f1 | −5.92 |
| f2 | 4.55 |
| f3 | −2.49 |
| f4 | 5.02 |
| f5 | 6.07 |
| f12 | 5.72 |
| f45 | 3.00 |
| f345 | 8.37 |

(C)

| SURFACE NUMBER | KA | RB3 | RB4 | RB5 | RB6 | RB7 | RB8 |
|---|---|---|---|---|---|---|---|
| 6 | 7.4210000E−04 | −5.9699053E−03 | 1.2285999E−02 | 5.2852114E−04 | −1.1817423E−03 | −3.1697260E−04 | 8.3400684E−05 |
| 7 | 2.5510000E−04 | −1.8225893E−02 | −1.2743416E−03 | 2.1001903E−03 | −2.5437616E−04 | 2.8618879E−05 | −1.6560130E−04 |
| 8 | −3.1563617E+00 | −1.2854970E−02 | 4.6648189E−03 | −4.7518218E−04 | −2.2830706E−04 | −1.0100047E−04 | 1.1928912E−05 |
| 9 | 1.1347605E+00 | 1.7143856E−05 | 8.5589186E−07 | −2.3214484E−07 | −1.8786133E−07 | −9.2092630E−08 | −3.9254609E−08 |
| 10 | 3.7200000E−05 | −5.7459346E−04 | −7.3695708E−03 | 1.1629444E−03 | 3.5098824E−04 | −1.1651076E−04 | 1.1208749E−05 |
| 11 | 0.0000000E+00 | 8.3195182E−07 | −6.9247075E−07 | −3.0529328E−07 | −1.0906156E−07 | −3.6960727E−08 | −1.2137078E−08 |

| SURFACE NUMBER | RB9 | RB10 | RB11 | RB12 | RB13 | RB14 |
|---|---|---|---|---|---|---|
| 6 | 4.9550436E−05 | −3.1125574E−05 | 1.5792802E−07 | 7.3132492E−08 | 3.3802332E−08 | 1.5690506E−08 |
| 7 | 7.7232049E−05 | −1.4417842E−05 | −7.0210485E−09 | −4.6211652E−09 | −3.2955120E−09 | 7.1075424E−10 |
| 8 | 4.6912230E−05 | −1.3895009E−05 | 3.8336713E−06 | −3.1384589E−09 | −1.5562406E−09 | −6.8429650E−10 |
| 9 | −1.5472616E−08 | −5.3182724E−09 | −6.8768428E−10 | 4.9499798E−10 | 4.1213895E−11 | 7.6276887E−11 |
| 10 | 3.9103025E−09 | 1.1104387E−09 | 8.8476122E−11 | 1.9041671E−11 | 7.4608491E−11 | 3.2966795E−12 |
| 11 | −3.6629166E−09 | 5.5599857E−10 | −9.8929181E−11 | 2.2710007E−11 | −5.0423555E−11 | 8.9045797E−14 |

| SURFACE NUMBER | RB15 | RB16 | RB17 | RB18 | RB19 | RB20 |
|---|---|---|---|---|---|---|
| 6 | 7.5854571E−09 | 4.0506593E−09 | 2.6500365E−09 | 2.5811335E−09 | 2.2452842E−09 | 1.2774701E−09 |
| 7 | 1.2754357E−09 | −9.8528726E−10 | 1.5064491E−11 | −2.8489677E−12 | 5.2905083E−12 | −3.8239310E−12 |

TABLE 1-continued

EXAMPLE 1

| | | | | | | |
|---|---|---|---|---|---|---|
| 8 | 2.8261117E−11 | −5.5729578E−11 | −8.6938235E−11 | −3.3728922E−11 | −1.5742408E−11 | −5.3536597E−12 |
| 9 | 9.7878385E−12 | 8.6211386E−12 | 1.3779350E−12 | 2.8313804E−13 | 3.4962371E−13 | 8.8488943E−14 |
| 10 | 6.5223269E−13 | 4.5948785E−13 | 8.1697421E−14 | 2.1089862E−14 | 2.6327407E−14 | 4.1528361E−15 |
| 11 | −1.8818889E−12 | −1.8651067E−12 | −3.6879402E−13 | −1.8685196E−14 | 3.9823042E−16 | −4.0839575E−15 |

TABLE 2

EXAMPLE 2

(A)

| Si | Ri | Di | Ndj | νdj |
|---|---|---|---|---|
| 1 | 73.2335 | 0.8000 | 1.58913 | 61.1 |
| 2 | 3.1657 | 2.1436 | | |
| 3 | 7.6858 | 4.0800 | 1.80400 | 46.6 |
| 4 | −6.1263 | −0.1000 | | |
| 5(St) | ∞ | 2.0000 | | |
| *6 | −2.5646 | 0.7500 | 1.63360 | 23.6 |
| *7 | 10.2506 | 0.1500 | | |
| *8 | 6.6355 | 1.7000 | 1.53158 | 55.5 |
| *9 | −3.7914 | 0.2200 | | |
| *10 | 5.5100 | 1.7500 | 1.53158 | 55.5 |
| 11 | ∞ | 3.5000 | | |
| 12 | ∞ | 1.1000 | 1.51680 | 64.2 |
| 13 | ∞ | 0.8197 | | |
| IMG | | | | |

(B)

| | |
|---|---|
| L(in Air) | 18.54 |
| Bf(in Air) | 5.05 |
| f | 4.63 |
| f1 | −5.64 |
| f2 | 4.88 |
| f3 | −3.17 |
| f4 | 4.81 |
| f5 | 10.37 |
| f12 | 6.36 |
| f45 | 3.43 |
| f345 | 9.01 |

(C)

| SURFACE NUMBER | KA | RB3 | RB4 | RB5 | RB6 |
|---|---|---|---|---|---|
| 6 | 0.0000000E+00 | −2.7107506E−03 | −2.2502291E−04 | 1.9534249E−03 | −1.2294642E−04 |
| 7 | 0.0000000E+00 | −1.5921050E−02 | 1.1008022E−03 | 1.7059656E−04 | −8.0196344E−04 |
| 8 | −3.1504000E+00 | −1.3139028E−02 | 2.3194690E−03 | −9.9136619E−04 | −3.7331239E−04 |
| 9 | 0.0000000E+00 | 0.0000000E+00 | −1.2816823E−04 | 0.0000000E+00 | 0.0000000E+00 |
| 10 | 0.0000000E+00 | −4.8328989E−04 | −3.4871698E−03 | 1.1222303E−03 | −9.5640719E−05 |

| SURFACE NUMBER | RB7 | RB8 | RB9 | RB10 | RB11 |
|---|---|---|---|---|---|
| 6 | −3.3439536E−04 | −1.5974598E−04 | −3.9237972E−05 | 7.6483668E−05 | 0.0000000E+00 |
| 7 | 5.4871760E−04 | −1.1013480E−04 | 7.7273291E−05 | −1.4400348E−05 | 0.0000000E+00 |
| 8 | −1.1258298E−04 | 4.4106692E−05 | 6.7481767E−05 | −1.4136780E−05 | 0.0000000E+00 |
| 9 | 0.0000000E+00 | 0.0000000E+00 | 0.0000000E+00 | 0.0000000E+00 | |
| 10 | −2.7707066E−04 | 8.2696211E−05 | 0.0000000E+00 | 0.0000000E+00 | 0.0000000E+00 |

TABLE 3

EXAMPLE 3

(A)

| Si | Ri | Di | Ndj | νdj |
|---|---|---|---|---|
| 1 | 261.0322 | 0.8000 | 1.58913 | 61.1 |
| 2 | 2.9871 | 2.4520 | | |
| 3 | 7.9914 | 4.0800 | 1.83481 | 42.71 |
| 4 | −6.1333 | −0.1000 | | |
| 5(St) | ∞ | 1.7614 | | |
| *6 | −3.2426 | 0.7500 | 1.63360 | 23.6 |
| *7 | 6.1442 | 0.1500 | | |
| *8 | 4.4753 | 1.7000 | 1.53158 | 55.5 |
| *9 | −4.7372 | 0.2200 | | |
| *10 | 6.6076 | 1.7500 | 1.53158 | 55.5 |
| 11 | ∞ | 4.0000 | | |
| 12 | ∞ | 1.1000 | 1.51680 | 64.2 |
| 13 | ∞ | 0.5312 | | |
| IMG | | | | |

(B)

| | |
|---|---|
| L(in Air) | 18.82 |
| Bf(in Air) | 5.26 |
| f | 4.63 |
| f1 | −5.13 |
| f2 | 4.79 |
| f3 | −3.25 |
| f4 | 4.63 |
| f5 | 12.43 |
| f12 | 5.79 |
| f45 | 3.54 |
| f345 | 11.99 |

(C)

| SURFACE NUMBER | K | RB3 | RB4 | RB5 | RB6 |
|---|---|---|---|---|---|
| 6 | 0.0000000E+00 | −1.1255624E−03 | −1.1939386E−03 | 1.2228935E−03 | −3.2046067E−04 |
| 7 | 0.0000000E+00 | −1.3516087E−02 | −2.2354906E−04 | 1.6151670E−04 | −4.5632691E−04 |
| 8 | −3.1504000E+00 | −1.2603121E−02 | 4.4795795E−03 | −1.0765295E−04 | −1.7425659E−04 |
| 9 | 0.0000000E+00 | 0.0000000E+00 | −3.5844275E−04 | 0.0000000E+00 | −8.6507181E−05 |
| 10 | 0.0000000E+00 | −6.3848350E−04 | −3.7152329E−03 | 1.1129135E−03 | −6.4367111E−05 |

| SURFACE NUMBER | RB7 | RB8 | RB9 | RB10 | RB11 |
|---|---|---|---|---|---|
| 6 | −1.8702067E−04 | 6.1262604E−05 | 2.5486955E−06 | −5.0534565E−06 | 0.0000000E+00 |
| 7 | 6.0493479E−04 | −2.8669432E−04 | 7.7273291E−05 | −1.4400348E−05 | 0.0000000E+00 |
| 8 | −1.2410642E−04 | 6.0352854E−06 | 4.7158840E−05 | −1.4901146E−05 | 0.0000000E+00 |
| 9 | 0.0000000E+00 | 0.0000000E+00 | 0.0000000E+00 | 0.0000000E+00 | 0.0000000E+00 |
| 10 | −2.6626170E−04 | 7.6945950E−05 | 0.0000000E+00 | 0.0000000E+00 | 0.0000000E+00 |

TABLE 4

EXAMPLE 4

(A)

| Si | Ri | Di | Ndj | νdj |
|---|---|---|---|---|
| 1 | 14.5361 | 0.8000 | 1.58913 | 61.1 |
| 2 | 3.0126 | 2.3572 | | |
| 3 | 9.1283 | 4.0808 | 1.83481 | 42.7 |
| 4 | −6.1636 | −0.1000 | | |
| 5(St) | ∞ | 1.9999 | | |
| *6 | −2.6514 | 0.7500 | 1.63360 | 23.6 |
| *7 | 5.1283 | 0.1784 | | |
| *8 | 5.3979 | 1.7838 | 1.53156 | 55.1 |
| *9 | −4.6349 | 0.2318 | | |
| *10 | 3.7251 | 1.7801 | 1.53156 | 55.1 |
| 11 | ∞ | 4.0000 | | |

TABLE 4-continued

EXAMPLE 4

| | | | | |
|---|---|---|---|---|
| 12 | ∞ | 1.1000 | 1.51680 | 64.2 |
| 13 | ∞ | 0.2337 | | |
| IMG | | | | |

(B)

| | |
|---|---|
| L(in Air) | 18.82 |
| Bf(in Air) | 4.96 |
| f | 4.63 |
| f1 | −6.62 |
| f2 | 5.02 |
| f3 | −2.66 |
| f4 | 5.00 |
| f5 | 7.01 |
| f12 | 6.22 |
| f45 | 3.13 |
| f345 | 8.08 |

(C)

| SURFACE NUMBER | K | RB3 | RB4 | RB5 | RB6 |
|---|---|---|---|---|---|
| 6 | 0.0000000E+00 | −6.5022436E−03 | 6.3818055E−03 | 6.6318434E−05 | −9.7510110E−04 |
| 7 | 0.0000000E+00 | −1.8445212E−02 | −1.2994037E−03 | 1.4739498E−03 | −3.1479998E−04 |
| 8 | −3.1504000E+00 | −1.1453761E−02 | 4.6859253E−03 | −2.9894152E−04 | −1.8202339E−04 |
| 9 | 9.0866369E−01 | 0.0000000E+00 | 0.0000000E+00 | 0.0000000E+00 | 0.0000000E+00 |
| 10 | 0.0000000E+00 | −8.6250970E−04 | −6.2051465E−03 | 1.3831654E−03 | 2.4954122E−04 |

| SURFACE NUMBER | RB7 | RB8 | RB9 | RB10 | RB11 |
|---|---|---|---|---|---|
| 6 | −1.7932219E−04 | 1.5515118E−04 | 9.0128328E−05 | −9.6231362E−06 | 0.0000000E+00 |
| 7 | 2.3480128E−04 | −8.5937920E−05 | 7.7273291E−05 | −1.4400348E−05 | 0.0000000E+00 |
| 8 | −9.1866666E−05 | 1.3354356E−05 | 5.2791328E−05 | −1.0806298E−05 | 0.0000000E+00 |
| 9 | 0.0000000E+00 | 0.0000000E+00 | 0.0000000E+00 | 0.0000000E+00 | 0.0000000E+00 |
| 10 | −1.8479728E−04 | 2.3390572E−05 | 0.0000000E+00 | 0.0000000E+00 | 0.0000000E+00 |

TABLE 5

EXAMPLE 5

(A)

| Si | Ri | Di | Ndj | νdj |
|---|---|---|---|---|
| 1 | 15.6304 | 1.1500 | 1.75500 | 52.3 |
| 2 | 3.0630 | 2.3097 | | |
| 3 | 7.4710 | 3.7511 | 1.83481 | 42.7 |
| 4 | −6.4230 | −0.1000 | | |
| 5(St) | ∞ | 1.9999 | | |
| *6 | −2.4341 | 0.7400 | 1.63360 | 23.6 |
| *7 | 6.2965 | 0.1500 | | |
| *8 | 4.1942 | 1.7560 | 1.53156 | 55.1 |
| *9 | −6.3387 | 0.2285 | | |
| *10 | 3.5998 | 1.7801 | 1.53156 | 55.1 |
| 11 | ∞ | 3.0000 | | |
| 12 | ∞ | 1.1000 | 1.51680 | 64.2 |
| 13 | ∞ | 1.6116 | | |
| IMG | | | | |

(B)

| | |
|---|---|
| L(in Air) | 19.10 |
| Bf(in Air) | 5.34 |
| f | 4.63 |
| f1 | −5.25 |
| f2 | 4.72 |
| f3 | −2.68 |
| f4 | 5.04 |
| f5 | 6.77 |
| f12 | 6.30 |

TABLE 5-continued

EXAMPLE 5

| | |
|---|---|
| f45 | 3.15 |
| f345 | 9.03 |

(C)

| SURFACE NUMBER | K | RB3 | RB4 | RB5 | RB6 |
|---|---|---|---|---|---|
| 6 | 0.0000000E+00 | −5.6104985E−03 | 1.1559937E−02 | 7.3011842E−04 | −1.0560347E−03 |
| 7 | 0.0000000E+00 | −1.6790467E−02 | −7.7088238E−04 | 2.2151459E−03 | −2.0487645E−04 |
| 8 | −3.1504000E+00 | −1.1643761E−02 | 4.8746791E−03 | −4.0422405E−04 | −2.0671830E−04 |
| 9 | 1.1977018E+00 | 0.0000000E+00 | 0.0000000E+00 | 0.0000000E+00 | 0.0000000E+00 |
| 10 | 0.0000000E+00 | −1.1237502E−03 | −7.8006806E−03 | 1.0641584E−03 | 3.1765316E−04 |

| SURFACE NUMBER | RB7 | RB8 | RB9 | RB10 | RB11 |
|---|---|---|---|---|---|
| 6 | −2.7673189E−04 | 1.0313097E−04 | 5.7837474E−05 | −3.3475651E−05 | 0.0000000E+00 |
| 7 | 2.4026798E−05 | −1.5786419E−04 | 7.7273291E−05 | −1.4400348E−05 | 0.0000000E+00 |
| 8 | −8.9857736E−05 | 2.0958762E−05 | 5.0895465E−05 | −1.6871316E−05 | 0.0000000E+00 |
| 9 | 0.0000000E+00 | 0.0000000E+00 | 0.0000000E+00 | 0.0000000E+00 | 0.0000000E+00 |
| 10 | −1.0885807E−04 | 9.4126869E−06 | 0.0000000E+00 | 0.0000000E+00 | 0.0000000E+00 |

TABLE 6

EXAMPLE 6

(A)

| Si | Ri | Di | Ndj | νdj |
|---|---|---|---|---|
| 1 | 16.9764 | 1.1500 | 1.75500 | 52.3 |
| 2 | 3.0503 | 2.1700 | | |
| 3 | 7.5180 | 3.9000 | 1.83481 | 42.7 |
| 4 | −6.2318 | −0.1000 | | |
| 5(St) | ∞ | 2.0200 | | |
| *6 | −2.4707 | 0.7400 | 1.63360 | 23.6 |
| *7 | 6.4930 | 0.1500 | | |
| *8 | 4.2440 | 1.7600 | 1.53114 | 55.4 |
| *9 | −6.0476 | 0.2700 | | |
| *10 | 3.7628 | 1.7800 | 1.53114 | 55.4 |
| 11 | ∞ | 3.5000 | | |
| 12 | ∞ | 1.4000 | 1.51680 | 64.2 |
| 13 | ∞ | 0.9056 | | |
| IMG | | | | |

(B)

| | |
|---|---|
| L(in Air) | 19.17 |
| Bf(in Air) | 5.33 |
| f | 4.63 |
| f1 | −5.11 |
| f2 | 4.69 |
| f3 | −2.74 |
| f4 | 4.99 |
| f5 | 7.08 |
| f12 | 6.34 |
| f45 | 3.19 |
| f345 | 9.05 |

(C)

| SURFACE NUMBER | K | RB3 | RB4 | RB5 | RB6 |
|---|---|---|---|---|---|
| 6 | 0.0000000E+00 | −4.9586569E−03 | 1.0823754E−02 | 6.1268923E−04 | −1.0396025E−03 |
| 7 | 0.0000000E+00 | −1.5362872E−02 | −3.1531385E−04 | 2.2613884E−03 | −2.3044412E−04 |
| 8 | −3.1504000E+00 | −1.1550375E−02 | 4.9063863E−03 | −3.8403142E−04 | −2.1218225E−04 |
| 9 | 2.0314934E+00 | 0.0000000E+00 | 0.0000000E+00 | 0.0000000E+00 | 0.0000000E+00 |
| 10 | 0.0000000E+00 | −7.1794512E−04 | −7.6284543E−03 | 1.0763660E−03 | 2.7782644E−04 |

TABLE 6-continued

EXAMPLE 6

| SURFACE NUMBER | RB7 | RB8 | RB9 | RB10 | RB11 |
|---|---|---|---|---|---|
| 6 | −2.5845860E−04 | 1.0907008E−04 | 5.6917496E−05 | −3.7765952E−05 | 0.0000000E+00 |
| 7 | −1.3816268E−05 | −1.5623971E−04 | 7.7273291E−05 | −1.4400348E−05 | 0.0000000E+00 |
| 8 | −9.9440351E−05 | 1.7576244E−05 | 4.9050452E−05 | −1.6379459E−05 | 0.0000000E+00 |
| 9 | 0.0000000E+00 | 0.0000000E+00 | 0.0000000E+00 | 0.0000000E+00 | 0.0000000E+00 |
| 10 | −1.2290478E−04 | 1.5905930E−05 | 0.0000000E+00 | 0.0000000E+00 | 0.0000000E+00 |

TABLE 7

EXAMPLE 7

(A)

| Si | Ri | Di | Ndj | νdj |
|---|---|---|---|---|
| 1 | 18.0010 | 1.0000 | 1.75500 | 52.3 |
| 2 | 3.0793 | 2.1000 | | |
| 3 | 7.0079 | 3.8200 | 1.83481 | 42.7 |
| 4 | −6.4679 | −0.1000 | | |
| 5(St) | ∞ | 1.9999 | | |
| *6 | −2.5212 | 0.7500 | 1.63355 | 23.6 |
| *7 | 5.6785 | 0.1833 | | |
| *8 | 4.2116 | 1.7560 | 1.53159 | 55.4 |
| *9 | −6.3035 | 0.2285 | | |
| *10 | 3.5504 | 1.7801 | 1.53159 | 55.4 |
| 11 | ∞ | 4.5000 | | |
| 12 | ∞ | 1.1000 | 1.51680 | 64.2 |
| 13 | ∞ | 0.0752 | | |
| IMG | | | | |

(B)

| | |
|---|---|
| L(in Air) | 18.82 |
| Bf(in Air) | 5.30 |
| f | 4.63 |
| f1 | −5.07 |
| f2 | 4.63 |
| f3 | −2.66 |
| f4 | 5.04 |
| f5 | 6.68 |
| f12 | 6.40 |
| f45 | 3.13 |
| f345 | 8.68 |

(C)

| SURFACE NUMBER | K | RB3 | RB4 | RB5 | RB6 |
|---|---|---|---|---|---|
| 6 | 0.0000000E+00 | −7.0064335E−03 | 1.1086219E−02 | 6.4929591E−04 | −1.0343992E−03 |
| 7 | 0.0000000E+00 | −1.7780435E−02 | −9.0156893E−04 | 2.2051457E−03 | −1.7836320E−04 |
| 8 | −3.1504000E+00 | −1.1035257E−02 | 4.9965325E−03 | −3.5864144E−04 | −1.8951648E−04 |
| 9 | 1.2275186E+00 | 0.0000000E+00 | 0.0000000E+00 | 0.0000000E+00 | 0.0000000E+00 |
| 10 | 0.0000000E+00 | −9.0705078E−04 | −7.6494641E−03 | 1.1086861E−03 | 3.3283570E−04 |

| SURFACE NUMBER | RB7 | RB8 | RB9 | RB10 | RB11 |
|---|---|---|---|---|---|
| 6 | −2.5257028E−04 | 1.1206013E−04 | 5.7778619E−05 | −3.2184804E−05 | 0.0000000E+00 |
| 7 | 7.5186035E−05 | −1.5953957E−04 | 7.7273291E−05 | −1.4400348E−05 | 0.0000000E+00 |
| 8 | −8.7447815E−05 | 1.5592921E−05 | 4.8136569E−05 | −1.4509871E−05 | 0.0000000E+00 |
| 9 | 0.0000000E+00 | 0.0000000E+00 | 0.0000000E+00 | 0.0000000E+00 | 0.0000000E+00 |
| 10 | −1.2479688E−04 | 9.9611120E−06 | 0.0000000E+00 | 0.0000000E+00 | 0.0000000E+00 |

TABLE 8

EXAMPLE 8

(A)

| Si | Ri | Di | Ndj | vdj |
|---|---|---|---|---|
| 1 | 16.8419 | 1.1500 | 1.75500 | 52.3 |
| 2 | 3.0503 | 2.1898 | | |
| 3 | 7.0361 | 3.7000 | 1.83481 | 42.7 |
| 4 | −6.6675 | −0.1000 | | |
| 5(St) | ∞ | 1.9999 | | |
| *6 | −2.7185 | 0.9101 | 1.63355 | 23.6 |
| *7 | 4.6307 | 0.0000 | | |
| *8 | 4.6307 | 1.7700 | 1.53159 | 55.4 |
| *9 | −5.3753 | 0.2700 | | |
| *10 | 3.3486 | 1.8300 | 1.53159 | 55.4 |
| 11 | ∞ | 4.0000 | | |
| 12 | ∞ | 1.1000 | 1.51680 | 64.2 |
| 13 | ∞ | 0.5962 | | |
| IMG | | | | |

(B)

| | |
|---|---|
| L(in Air) | 19.04 |
| Bf(in Air) | 5.32 |
| f | 4.64 |
| f1 | −5.12 |
| f2 | 4.68 |
| f3 | −2.58 |
| f4 | 4.99 |
| f5 | 6.30 |
| f12 | 6.53 |
| f45 | 3.03 |
| f345 | 8.70 |

(C)

| SURFACE NUMBER | KA | RB3 | RB4 | RB5 | RB6 |
|---|---|---|---|---|---|
| 6 | 0.0000000E+00 | −4.3294547E−03 | 1.0375536E−02 | 2.7180091E−04 | −1.1544423E−03 |
| 7 | 0.0000000E+00 | 2.4813776E−02 | −5.9690648E−03 | −2.9143316E−03 | −3.3142144E−03 |
| 8 | −3.1504000E+00 | −1.5212905E−02 | 4.7787534E−03 | 8.1299010E−04 | 7.6857234E−04 |
| 9 | 2.0440854E+00 | 0.0000000E+00 | 0.0000000E+00 | 0.0000000E+00 | 0.0000000E+00 |
| 10 | 0.0000000E+00 | 9.1662639E−04 | −6.6412150E−03 | 8.4548826E−04 | 2.4718706E−04 |

| SURFACE NUMBER | RB7 | RB8 | RB9 | RB10 | RB11 |
|---|---|---|---|---|---|
| 6 | −2.6803369E−04 | 1.0990214E−04 | 5.8126903E−05 | −3.4105384E−05 | 0.0000000E+00 |
| 7 | −1.9390780E−04 | −3.7075455E−04 | 7.7273291E−05 | −1.4400348E−05 | 0.0000000E+00 |
| 8 | 2.8857776E−04 | −4.3936271E−05 | 6.8438045E−05 | −5.5067079E−05 | 0.0000000E+00 |
| 9 | 0.0000000E+00 | 0.0000000E+00 | 0.0000000E+00 | 0.0000000E+00 | |
| 10 | 6.4132985E−06 | −1.5741233E−05 | 0.0000000E+00 | 0.0000000E+00 | 0.0000000E+00 |

TABLE 9

EXAMPLE 9

(A)

| Si | Ri | Di | Ndj | vdj |
|---|---|---|---|---|
| 1 | 8.1769 | 1.1500 | 1.58913 | 61.1 |
| 2 | 2.8397 | 2.7357 | | |
| 3 | 8.0733 | 3.8000 | 1.83481 | 42.7 |
| 4 | −6.1639 | −0.1000 | | |
| 5(St) | ∞ | 1.9999 | | |
| *6 | −2.0579 | 0.7500 | 1.65245 | 21.0 |
| *7 | 9.7024 | 0.1549 | | |
| *8 | 4.4831 | 1.8059 | 1.54491 | 54.9 |
| *9 | −6.3746 | 0.2293 | | |
| *10 | 2.9812 | 1.7801 | 1.54491 | 54.9 |
| *11 | 33.1685 | 2.5000 | | |

TABLE 9-continued

EXAMPLE 9

| | | | | |
|---|---|---|---|---|
| 12 | ∞ | 1.1000 | 1.51680 | 64.2 |
| 13 | ∞ | 0.4717 | | |
| IMG | | | | |

(B)

| | |
|---|---|
| L(in Air) | 18.00 |
| Bf(in Air) | 3.70 |
| f | 4.62 |
| f1 | −8.03 |
| f2 | 4.77 |
| f3 | −2.54 |
| f4 | 5.13 |
| f5 | 5.89 |
| f12 | 5.53 |
| f45 | 2.97 |
| f345 | 7.33 |

(C)

| SURFACE NUMBER | KA | RB3 | RB4 | RB5 | RB6 |
|---|---|---|---|---|---|
| 6 | 0.0000000E+00 | 2.0354818E−03 | 1.4388834E−02 | 7.9875337E−04 | −1.5163673E−03 |
| 7 | 0.0000000E+00 | −1.9126280E−02 | −2.0700688E−03 | 1.7929691E−03 | −3.0915756E−04 |
| 8 | −3.1504000E+00 | −2.5479397E−02 | 4.3594947E−03 | −1.7016710E−04 | −1.1627968E−04 |
| 9 | −2.6180004E+00 | 0.0000000E+00 | 0.0000000E+00 | 0.0000000E+00 | 0.0000000E+00 |
| 10 | 0.0000000E+00 | 1.5729890E−03 | −7.0390064E−03 | 1.2484620E−03 | 2.9036813E−04 |
| 11 | 1.0000000E+00 | −6.6268105E−05 | −7.1698275E−05 | | |

| SURFACE NUMBER | RB7 | RB8 | RB9 | RB10 | RB11 |
|---|---|---|---|---|---|
| 6 | −6.0582656E−04 | 1.0544416E−04 | 6.8401397E−05 | 1.2330849E−05 | 0.0000000E+00 |
| 7 | 3.6538154E−05 | −1.0506030E−04 | 7.7273291E−05 | −1.4400348E−05 | 0.0000000E+00 |
| 8 | −8.3061991E−05 | 5.8387586E−06 | 4.5793501E−05 | −1.2991379E−05 | 0.0000000E+00 |
| 9 | 0.0000000E+00 | 0.0000000E+00 | 0.0000000E+00 | 0.0000000E+00 | |
| 10 | −7.4852849E−05 | 3.6298285E−06 | 0.0000000E+00 | 0.0000000E+00 | 0.0000000E+00 |
| 11 | | | | | |

TABLE 10

EXAMPLE 10

(A)

| Si | Ri | Di | Ndj | νdj |
|---|---|---|---|---|
| 1 | 8.3435 | 1.1500 | 1.51680 | 64.2 |
| 2 | 3.0503 | 3.4495 | | |
| 3 | 8.9004 | 2.8257 | 1.75500 | 52.3 |
| 4 | −6.6069 | −0.1000 | | |
| 5(St) | ∞ | 2.0000 | | |
| *6 | −2.3213 | 0.7501 | 1.61396 | 25.5 |
| *7 | 5.2694 | 0.1600 | | |
| *8 | 4.6143 | 1.7001 | 1.51104 | 56.8 |
| *9 | −6.0013 | 0.2700 | | |
| *10 | 3.2362 | 1.8300 | 1.51104 | 56.8 |
| 11 | −100.0000 | 4.0000 | | |
| 12 | ∞ | 1.1000 | 1.51680 | 64.2 |
| 13 | ∞ | 0.4048 | | |
| IMG | | | | |

(B)

| | |
|---|---|
| L(in Air) | 19.17 |
| Bf(in Air) | 5.13 |
| f | 5.33 |
| f1 | −10.05 |
| f2 | 5.45 |
| f3 | −2.53 |
| f4 | 5.40 |
| f5 | 6.17 |
| f12 | 6.38 |

TABLE 10-continued

EXAMPLE 10

| | |
|---|---|
| f45 | 3.15 |
| f345 | 9.13 |

(C)

| SURFACE NUMBER | KA | RB3 | RB4 | RB5 | RB6 |
|---|---|---|---|---|---|
| 6 | 0.0000000E+00 | −8.7285698E−03 | 1.3557483E−02 | 1.0095436E−03 | −1.2145805E−03 |
| 7 | 0.0000000E+00 | −2.0587205E−02 | −1.0954421E−03 | 2.6345715E−03 | −1.8275848E−04 |
| 8 | −3.1504000E+00 | −9.5391679E−03 | 4.4420294E−03 | −7.8949753E−04 | −3.1834594E−04 |
| 9 | 3.7220140E−01 | 0.0000000E+00 | 0.0000000E+00 | 0.0000000E+00 | 0.0000000E+00 |
| 10 | 0.0000000E+00 | −2.8974195E−03 | −7.6283657E−03 | 1.2055668E−03 | 3.6660103E−04 |

| SURFACE NUMBER | RB7 | RB8 | RB9 | RB10 | RB11 |
|---|---|---|---|---|---|
| 6 | −4.0206555E−04 | 1.2951801E−04 | 5.8917219E−05 | −1.0093250E−05 | 0.0000000E+00 |
| 7 | −4.4173106E−04 | 2.2643294E−05 | 7.7273291E−05 | −1.4400348E−05 | 0.0000000E+00 |
| 8 | −1.0076586E−04 | 3.8366006E−05 | 5.3479175E−05 | −1.6127177E−05 | 0.0000000E+00 |
| 9 | 0.0000000E+00 | 0.0000000E+00 | 0.0000000E+00 | 0.0000000E+00 | |
| 10 | −1.4408854E−04 | 1.5908186E−05 | 0.0000000E+00 | 0.0000000E+00 | 0.0000000E+00 |

TABLE 11

EXAMPLE 11

(A)

| Si | Ri | Di | Ndj | vdj |
|---|---|---|---|---|
| 1 | 10.2043 | 1.0000 | 1.71300 | 53.9 |
| 2 | 2.9204 | 2.5863 | | |
| 3 | 7.1210 | 3.8014 | 1.82080 | 42.7 |
| 4 | −6.4596 | 0.1000 | | |
| 5(St) | ∞ | 1.7999 | | |
| *6 | −2.5073 | 0.7500 | 1.65150 | 20.5 |
| *7 | 9.5953 | 0.1501 | | |
| *8 | 8.8320 | 1.7507 | 1.53389 | 56.0 |
| *9 | −6.3666 | 0.2203 | | |
| *10 | 3.0645 | 1.7801 | 1.53389 | 56.0 |
| 11 | ∞ | 3.5000 | | |
| 12 | ∞ | 1.1000 | 1.51680 | 64.2 |
| 13 | ∞ | 0.4888 | | |
| IMG | | | | |

(B)

| | |
|---|---|
| L(in Air) | 18.65 |
| Bf(in Air) | 4.71 |
| f | 4.63 |
| f1 | −6.09 |
| f2 | 4.72 |
| f3 | −2.98 |
| f4 | 7.22 |
| f5 | 5.74 |
| f12 | 5.80 |
| f45 | 3.39 |
| f345 | 8.34 |

(C)

| SURFACE NUMBER | KA | RB3 | RB4 | RB5 | RB6 |
|---|---|---|---|---|---|
| 6 | 0.0000000E+00 | −5.2967376E−03 | 1.1461114E−02 | 4.0839195E−04 | −1.0967653E−03 |
| 7 | 0.0000000E+00 | −1.6778183E−02 | −6.7827910E−04 | 2.3791271E−03 | −1.5797889E−04 |
| 8 | −3.1504000E+00 | −1.3985292E−02 | 4.2046323E−03 | −5.4441192E−04 | −1.7235982E−04 |
| 9 | −6.0252110E−01 | 0.0000000E+00 | 0.0000000E+00 | 0.0000000E+00 | 0.0000000E+00 |
| 10 | 0.0000000E+00 | −3.0284333E−05 | −6.8151833E−03 | 1.1508013E−03 | 3.4289735E−04 |

TABLE 11-continued

EXAMPLE 11

| SURFACE NUMBER | RB7 | RB8 | RB9 | RB10 | RB11 |
|---|---|---|---|---|---|
| 6 | −2.4353990E−04 | 1.3594193E−04 | 8.0585943E−05 | −3.4512073E−05 | 0.0000000E+00 |
| 7 | 6.4044278E−05 | −1.0902670E−04 | 7.7273291E−05 | −1.4400348E−05 | 0.0000000E+00 |
| 8 | −4.2643749E−05 | 4.2857627E−05 | 5.6268660E−05 | −1.7296821E−05 | 0.0000000E+00 |
| 9 | 0.0000000E+00 | 0.0000000E+00 | 0.0000000E+00 | 0.0000000E+00 | |
| 10 | −1.0815866E−04 | 7.3084866E−06 | 0.0000000E+00 | 0.0000000E+00 | 0.0000000E+00 |

TABLE 12

EXAMPLE 12

(A)

| Si | Ri | Di | Ndj | νdj |
|---|---|---|---|---|
| 1 | 15.7010 | 1.0000 | 1.58913 | 61.1 |
| 2 | 2.9665 | 2.7940 | | |
| 3 | 7.3164 | 3.8017 | 1.83481 | 42.7 |
| 4 | −6.8507 | −0.1000 | | |
| 5(St) | ∞ | 1.9999 | | |
| *6 | −2.4731 | 0.9001 | 1.65150 | 20.5 |
| *7 | 12.0181 | 0.0000 | | |
| *8 | 12.0181 | 1.7507 | 1.53389 | 56.0 |
| *9 | −5.9608 | 0.2202 | | |
| *10 | 3.0582 | 1.7801 | 1.53389 | 56.0 |
| 11 | ∞ | 3.5000 | | |
| 12 | ∞ | 1.1000 | 1.51680 | 64.2 |
| 13 | ∞ | 0.4467 | | |
| IMG | | | | |

(B)

| | |
|---|---|
| L(in Air) | 18.82 |
| Bf(in Air) | 4.67 |
| f | 4.63 |
| f1 | −6.39 |
| f2 | 4.83 |
| f3 | −3.07 |
| f4 | 7.73 |
| f5 | 5.73 |
| f12 | 5.69 |
| f45 | 3.45 |
| f345 | 8.64 |

(C)

| SURFACE NUMBER | K | RB3 | RB4 | RB5 | RB6 |
|---|---|---|---|---|---|
| 6 | 0.0000000E+00 | −2.0849408E−03 | 1.3149969E−02 | −3.2606575E−04 | −1.9582486E−03 |
| 7 | −3.1504000E+00 | −1.9362794E−02 | 1.7432512E−03 | 1.5455690E−04 | 9.5505231E−04 |
| 8 | −3.1504000E+00 | −1.9362794E−02 | 1.7432512E−03 | 1.5455690E−04 | 9.5505231E−04 |
| 9 | −9.6334300E−02 | 0.0000000E+00 | 0.0000000E+00 | 0.0000000E+00 | 0.0000000E+00 |
| 10 | 0.0000000E+00 | −1.6518672E−03 | −5.6003529E−03 | 7.2175942E−04 | 4.0156232E−04 |

| SURFACE NUMBER | RB7 | RB8 | RB9 | RB10 |
|---|---|---|---|---|
| 6 | −4.7884801E−04 | 3.6073157E−04 | 3.3179060E−04 | −1.5930058E−04 |
| 7 | 4.8281589E−04 | 8.4492235E−06 | −1.3208260E−04 | 1.4469498E−05 |
| 8 | 4.8281589E−04 | 8.4492235E−06 | −1.3208260E−04 | 1.4469498E−05 |
| 9 | | | | |
| 10 | −1.0779728E−04 | 7.0161325E−06 | | |

TABLE 13

EXAMPLE 13

(A)

| Si | Ri | Di | Ndj | vdj |
|---|---|---|---|---|
| 1 | 12.0803 | 1.0000 | 1.75500 | 52.3 |
| 2 | 3.0315 | 2.5519 | | |
| 3 | 8.1754 | 3.8183 | 1.88300 | 40.8 |
| 4 | −6.6141 | 0.1685 | | |
| 5(St) | ∞ | 1.8413 | | |
| *6 | −2.4148 | 0.7500 | 1.63355 | 23.6 |
| *7 | 5.4137 | 0.1714 | | |
| *8 | 4.2452 | 1.7561 | 1.54491 | 55.9 |
| *9 | −5.9682 | 0.2287 | | |
| *10 | 3.4310 | 1.7801 | 1.54491 | 55.9 |
| 11 | ∞ | 3.8000 | | |
| 12 | ∞ | 1.1000 | 1.51680 | 64.2 |
| 13 | ∞ | 0.1167 | | |
| IMG | | | | |

(B)

| | |
|---|---|
| L(in Air) | 18.71 |
| Bf(in Air) | 4.64 |
| f | 4.33 |
| f1 | −5.63 |
| f2 | 4.71 |
| f3 | −2.54 |
| f4 | 4.85 |
| f5 | 6.30 |
| f12 | 5.84 |
| f45 | 2.99 |
| f345 | 7.78 |

(C)

| SURFACE NUMBER | KA | RB3 | RB4 | RB5 | RB6 |
|---|---|---|---|---|---|
| 6 | 0.0000000E+00 | −6.9243313E−03 | 1.1628386E−02 | 4.7594051E−04 | −1.1698610E−03 |
| 7 | 0.0000000E+00 | −1.7789665E−02 | −9.9487636E−04 | 2.1885858E−03 | −2.3848169E−04 |
| 8 | −3.1504000E+00 | −1.1060258E−02 | 5.0041385E−03 | −3.7844249E−04 | −1.9893842E−04 |
| 9 | 1.3304115E+00 | 0.0000000E+00 | 0.0000000E+00 | 0.0000000E+00 | 0.0000000E+00 |
| 10 | 0.0000000E+00 | −6.5644250E−04 | −7.7137135E−03 | 1.1132845E−03 | 3.4267331E−04 |

| SURFACE NUMBER | RB7 | RB8 | RB9 | RB10 | RB11 |
|---|---|---|---|---|---|
| 6 | −2.7295292E−04 | 1.3736059E−04 | 7.6209866E−05 | −3.7430880E−05 | 0.0000000E+00 |
| 7 | 4.4564223E−05 | −1.3151668E−04 | 7.7273291E−05 | −1.4400348E−05 | 0.0000000E+00 |
| 8 | −9.1683737E−05 | 1.3128650E−05 | 4.7761844E−05 | −1.3309907E−05 | 0.0000000E+00 |
| 9 | 0.0000000E+00 | 0.0000000E+00 | 0.0000000E+00 | 0.0000000E+00 | |
| 10 | −1.1830197E−04 | 6.5195384E−06 | 0.0000000E+00 | 0.0000000E+00 | 0.0000000E+00 |

TABLE 14

| | CONDITIONAL EXPRESSION | | | | | | | | | | | | |
|---|---|---|---|---|---|---|---|---|---|---|---|---|---|
| EXAMPLE | (1) Nd3 | (2) vd3 | (3) (R1 + R2)/ R1 − R2) | (4) (R3 + R4)/ (R3 − R4) | (5) f12/f | (6) R1/f | (7) f1/f | (8) (R8 + R9)/ (R8 − R9) | (9) (R10 + R11)/ (R10 − R11) | (10) f3/f | (11) f4/f | (12) f45/f3 | (13) f345/f |
| 1 | 1.63 | 23.60 | 1.88 | 0.05 | 1.21 | 2.02 | −1.25 | −0.20 | −1.05 | −0.53 | 1.06 | −1.20 | 1.77 |
| 2 | 1.63 | 23.60 | 1.09 | 0.11 | 1.37 | 15.82 | −1.22 | 0.27 | −1.00 | −0.68 | 1.04 | −1.08 | 1.95 |
| 3 | 1.63 | 23.60 | 1.02 | 0.13 | 1.25 | 56.38 | −1.11 | −0.03 | −1.00 | −0.70 | 1.00 | −1.09 | 2.59 |
| 4 | 1.63 | 23.60 | 1.52 | 0.19 | 1.34 | 3.14 | −1.43 | 0.08 | −1.00 | −0.57 | 1.08 | −1.18 | 1.75 |
| 5 | 1.63 | 23.60 | 1.49 | 0.08 | 1.36 | 3.38 | −1.13 | −0.20 | −1.00 | −0.58 | 1.09 | −1.18 | 1.95 |
| 6 | 1.63 | 23.60 | 1.44 | 0.09 | 1.37 | 3.67 | −1.10 | −0.18 | −1.00 | −0.59 | 1.08 | −1.16 | 1.95 |
| 7 | 1.63 | 23.60 | 1.41 | 0.04 | 1.38 | 3.89 | −1.10 | −0.20 | −1.00 | −0.57 | 1.09 | −1.18 | 1.87 |
| 8 | 1.63 | 23.60 | 1.44 | 0.03 | 1.41 | 3.63 | −1.10 | −0.07 | −1.00 | −0.56 | 1.08 | −1.17 | 1.88 |
| 9 | 1.65 | 21.00 | 2.06 | 0.13 | 1.20 | 1.77 | −1.74 | −0.17 | −1.20 | −0.55 | 1.11 | −1.17 | 1.59 |
| 10 | 1.61 | 25.50 | 2.15 | 0.15 | 1.20 | 1.57 | −1.89 | −0.13 | −0.94 | −0.47 | 1.01 | −1.25 | 1.71 |
| 11 | 1.65 | 20.50 | 1.80 | 0.05 | 1.25 | 2.20 | −1.32 | 0.16 | −1.00 | −0.64 | 1.56 | −1.14 | 1.80 |
| 12 | 1.65 | 20.50 | 1.47 | 0.03 | 1.23 | 3.39 | −1.38 | 0.34 | −1.00 | −0.66 | 1.67 | −1.12 | 1.87 |
| 13 | 1.63 | 23.60 | 1.67 | 0.11 | 1.35 | 2.79 | −1.30 | −0.17 | −1.00 | −0.59 | 1.12 | −1.18 | 1.80 |

TABLE 15

| | CONDITIONAL EXPRESSION | | |
|---|---|---|---|
| EXAMPLE | (14) f12/f345 | (15) (DA + DB)/f | (16) f1/f2 |
| 1 | 0.68 | 1.23 | −1.30 |
| 2 | 0.71 | 1.29 | −1.16 |
| 3 | 0.48 | 1.24 | −1.07 |
| 4 | 0.77 | 1.29 | −1.32 |
| 5 | 0.70 | 1.22 | −1.11 |
| 6 | 0.70 | 1.26 | −1.09 |
| 7 | 0.74 | 1.24 | −1.10 |
| 8 | 0.75 | 1.21 | −1.09 |
| 9 | 0.75 | 1.23 | −1.68 |
| 10 | 0.70 | 0.89 | −1.84 |
| 11 | 0.70 | 1.23 | −1.29 |
| 12 | 0.66 | 1.23 | −1.32 |
| 13 | 0.75 | 1.35 | −1.20 |

In Examples 2, 3, 4, 5, 6, 7, 8, 10 and 13, it is assumed that rays are cut at predetermined surfaces. In Examples 2, 3 and 6, the object-side surface of fifth lens L5 is φ4.64. In Example 4, the object-side surface of fourth lens L4 is φ3.8. In Example 5, the image-side surface of fourth lens L4 is φ4.7. In Examples 7 and 8, the object-side surface of fifth lens L5 is φ4.8. In Example 10, the object-side surface of fifth lens L5 is φ5.4. In Example 13, the object-side surface of fifth lens L5 is φ5.6.

In the imaging lenses of Examples 1 through 13, first lens L1 and second lens L2 are spheric lenses of glass. Third lens L3 through fifth lens L5 are aspheric lenses of plastic. For example, in first lens L1 and second lens L2 of Examples 1 through 13, material with refractive index Nd: 1.75500 and Abbe number vd: 52.3 is S-YGH51 produced by Ohara Inc. Alternatively, material having similar properties, and which is produced by another company, may be used. For example, TAC6 produced by Hoya Corporation, K-LASKN1 produced by SUMITA OPTICAL GLASS Inc., H-LAK53A produced by CDGM Glass Co., Ltd. or the like may be used.

Material with refractive index Nd: 1.83481 and Abbe number vd: 42.7 is S-LAH55V produced by Ohara Inc. Alternatively, TAFD5F produced by Hoya Corporation, K-LASFN8 produced by SUMITA OPTICAL GLASS Inc., H-ZLAF55A produced by CDGM Glass Co., Ltd. or the like may be used.

Material with refractive index Nd: 1.58913 and Abbe number vd: 61.1 is S-BAL35 produced by Ohara Inc. Alternatively, BACD5 produced by Hoya Corporation, K-SK5 produced by SUMITA OPTICAL GLASS Inc., H-ZK3 produced by CDGM Glass Co., Ltd. or the like may be used.

Material with refractive index Nd: 1.80400 and Abbe number vd: 46.6 is S-LAH65V produced by Ohara Inc. Alternatively, TAF3 produced by HOYA Corporation, K-LASFN6 produced by SUMITA OPTICAL GLASS Inc., H-ZLAF50D produced by CDGM Glass Co., Ltd. or the like may be used.

Material with refractive index Nd: 1.51680 and Abbe number vd: 64.2 is BSC7 produced by HOYA Corporation. Alternatively, S-BSL7 produced by Ohara Inc., K-BK7 produced by SUMITA OPTICAL GLASS Inc., H-K9L produced by CDGM Glass Co., Ltd., N-BK7 produced by Schott AG or the like may be used.

Material with refractive index Nd: 1.71300 and Abbe number vd: 53.9 is S-LAL8 produced by Ohara Inc. Alternatively, LAC8 produced by HOYA Corporation, K-LAK8 produced by SUMITA OPTICAL GLASS Inc., H-LAK7A produced by CDGM Glass Co., Ltd. or the like may be used.

Material with refractive index Nd: 1.82080 and Abbe number vd: 42.7 is M-TAFD51 produced by HOYA Corporation. Alternatively, Q-LASFH59S produced by Hikari Glass Co., Ltd. or the like may be used.

Material with refractive index Nd: 1.88300 and Abbe number vd: 40.8 is S-LAH58 produced by Ohara Inc. Alternatively, TAFD30 produced by HOYA Corporation, K-LASFN17 produced by SUMITA OPTICAL GLASS Inc., H-ZLAF68 produced by CDGM Glass Co., Ltd. or the like may be used.

[Aberration Performance]

FIG. 16, Sections A through D, FIG. 17, Sections A through D, FIG. 18, Sections A through D, FIG. 19, Sections A through D, FIG. 20, Sections A through D, FIG. 21, Sections A through D, FIG. 22, Sections A through D, FIG. 23, Sections A through D, FIG. 24, Sections A through D, FIG. 25, Sections A through D, FIG. 26, Sections A through D, FIG. 27, Sections A through D, and FIG. 28, Sections A through D are aberration diagrams of the imaging lenses in Examples 1 through 13, respectively.

Here, the aberration diagrams of Example 1 will be explained as an example, but the aberration diagrams of the other examples are similar to those of Example 1. FIG. 16, Section A, Section B, Section C and Section D illustrate a spherical aberration, astigmatism, distortion, and a lateral chromatic aberration of the imaging lens of Example 1, respectively. In the spherical aberration diagram, F represents an F-number, and in the other diagrams, ω represents a half angle of view. The diagram of distortion illustrates a shift amount from an ideal image height f×tan(φ), which is represented by using focal length f of the entire system and angle φ of view (used as a variable, $0 \leq \phi \leq \omega$). Each aberration diagram illustrates an aberration when d-line (wavelength 587.56 nm) is a reference wavelength. The spherical aberration diagram illustrates aberrations also for F-line (wavelength 486.13 nm), C-line (wavelength 656.27 nm), and an offense against the sine condition (represented as SNC). Further, the diagram of a lateral chromatic aberration illustrates aberrations for F-line and C-line. Since the line types used in the lateral chromatic aberration diagram are the same as those used in the spherical aberration diagram, descriptions of the line types will be omitted.

As these data show, each of the imaging lenses of Examples 1 through 13 consists of five lenses, which are a small number of lenses, and is producible in small size and at low cost. Further, the F-number is 1.9, which is small, and the imaging lenses have excellent optical performance in which each of the aberrations is excellently corrected. These imaging lenses are appropriate for use in a surveillance camera, an in-vehicle camera for imaging the front, the lateral sides, the rear or the like of a car and the like.

[Embodiment of Imaging Apparatus]

Figure 29:
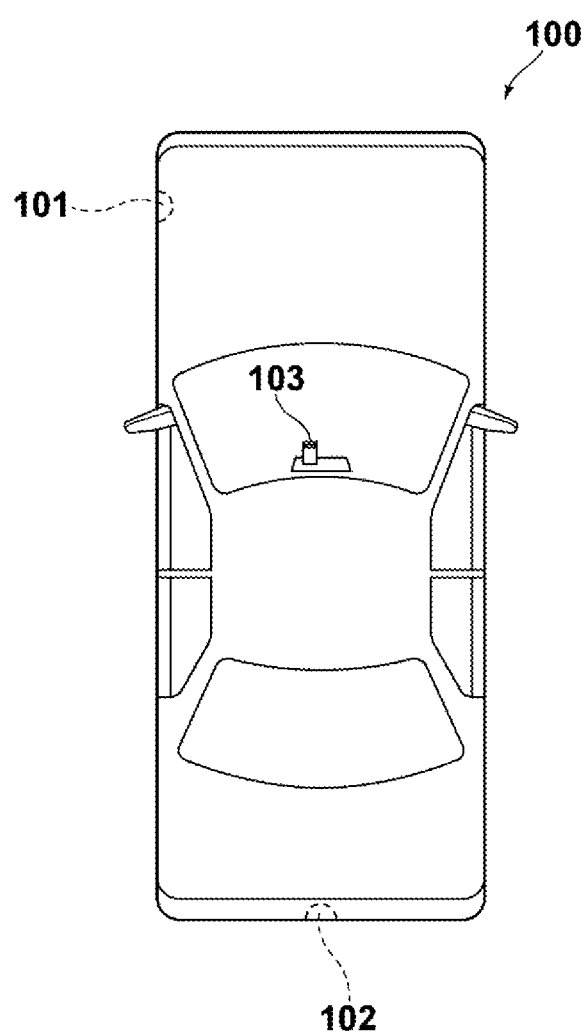
FIG. 29 is a diagram for explaining arrangement of an imaging apparatus for in-vehicle use according to an embodiment of the present disclosure.

FIG. 29 illustrates, as an example of use, a manner of installing imaging apparatuses including imaging lenses according to embodiments of the present disclosure in a car 100. In FIG. 29, the car 100 includes an exterior camera 101 for imaging a driver's blind spot toward a side of a seat next to the driver, an exterior camera 102 for imaging a driver's blind spot toward the rear of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to embodiments of the present disclosure, and they include imaging lenses according to embodiments of the present disclosure and imaging devices for converting optical images formed by the imaging lenses into electrical signals.

The imaging lenses according to the embodiments of the present disclosure have the aforementioned advantages. Therefore, the exterior cameras 101 and 102, and the interior camera 103 are configurable in small size and at low cost. They have wide angles of view, and excellent images are obtainable even in a peripheral portion of an image formation area.

So far, the present disclosure has been described by using embodiments and examples. However, the present disclosure is not limited to the aforementioned embodiments nor examples, and various modifications are possible. For example, values of a curvature radius, a distance between surfaces, a refractive index, and an Abbe number of each lens element are not limited to the values in the aforementioned numerical value examples, but may be other values.

In the aforementioned examples, all of the lenses are made of homogeneous material. Alternatively, a refractive index distribution type lens or lenses may be used. Further, in some of the aforementioned examples, third lens L3 through fifth lens L5 consist of refraction-type lenses having aspheric surfaces, but a diffraction optical element or elements may be formed on one or plural surfaces.

In the embodiment of the imaging apparatus, a case in which the present disclosure is applied to an in-vehicle camera is illustrated in the drawing and described. However, use of the present disclosure is not limited to this purpose. For example, the present disclosure may be applied to a camera for a mobile terminal, a surveillance camera, and the like.

What is claimed is:

1. An imaging lens consisting of, in order from the object side:
   a first lens having negative refractive power;
   a second lens having positive refractive power;
   a third lens having negative refractive power;
   a fourth lens having positive refractive power; and
   a fifth lens having positive refractive power, wherein the following conditional expressions are satisfied:

$$Nd3<1.75 \quad (1);$$

$$vd3<27 \quad (2);$$

$$0.0 \leq (R3+R4)/(R3-R4) \quad (4); \text{ and}$$

$$f12/f<1.5 \quad (5), \text{ where}$$

Nd3 is a refractive index of the material of the third lens for d-line,
   vd3 is an Abbe number of the material of the third lens for d-line,
   R3 is a curvature radius of an object-side surface of the second lens,
   R4 is a curvature radius of an image-side surface of the second lens,
   f12 is a combined focal length of the first lens and the second lens, and
   f is a focal length of an entire system.

2. The imaging lens, as defined in claim 1, wherein the following conditional expression is satisfied:

$$0.0<R1/f \quad (6), \text{ where}$$

R1 is a curvature radius of an object-side surface of the first lens, and
   f is a focal length of an entire system.

3. The imaging lens, as defined in claim 1, wherein the following conditional expression is satisfied:

$$-3.0<f1/f<-0.5 \quad (7), \text{ where}$$

f1 is a focal length of the first lens, and
   f is a focal length of an entire system.

4. The imaging lens, as defined in claim 1, wherein the following conditional expression is satisfied:

$$-0.8<(R8+R9)/(R8-R9)<0.8 \quad (8), \text{ where}$$

R8 is a curvature radius of an object-side surface of the fourth lens, and
   R9 is a curvature radius of an image-side surface of the fourth lens.

5. The imaging lens, as defined in claim 1, wherein the following conditional expression is satisfied:

$$-2.5<(R10+R11)/(R10-R11)<-0.4 \quad (9), \text{ where}$$

R10 is a curvature radius of an object-side surface of the fifth lens, and
   R11 is a curvature radius of an image-side surface of the fifth lens.

6. The imaging lens, as defined in claim 1, wherein the following conditional expression is satisfied:

$$-2.0<f3/f<-0.2 \quad (10), \text{ where}$$

f3 is a focal length of the third lens, and
   f is a focal length of an entire system.

7. The imaging lens, as defined in claim 1, wherein the following conditional expression is satisfied:

$$0.5<f4/f<2.5 \quad (11), \text{ where}$$

f4 is a focal length of the fourth lens, and
   f is a focal length of an entire system.

8. The imaging lens, as defined in claim 1, wherein the following conditional expression is satisfied:

$$-3.5<f45/f3<-0.3 \quad (12), \text{ where}$$

f45 is a combined focal length of the fourth lens and the fifth lens, and
   f3 is a focal length of the third lens.

9. The imaging lens, as defined in claim 1, wherein the following conditional expression is satisfied:

$$0.5<f345/f<4.0 \quad (13), \text{ where}$$

f345 is a combined focal length of the third lens, the fourth lens and the fifth lens, and
   f is a focal length of an entire system.

10. The imaging lens, as defined in claim 1, wherein the following conditional expression is satisfied:

$$0.2<f12/f345<3.0 \quad (14), \text{ where}$$

f12 is a combined focal length of the first lens and the second lens, and
    f345 is a combined focal length of the third lens, the fourth lens and the fifth lens.

11. The imaging lens, as defined in claim 1, wherein the following conditional expression is satisfied:

$$0.2<(DA+DB)/f<3.0 \quad (15), \text{ where}$$

DA is a center thickness of the second lens,
    DB is an air space between the second lens and the third lens, and
    f is a focal length of an entire system.

12. The imaging lens, as defined in claim 1, wherein the following conditional expression is satisfied:

$$-3.0<f1/f2<-0.6 \quad (16), \text{ where}$$

f1 is a focal length of the first lens, and
    f2 is a focal length of the second lens.

13. The imaging lens, as defined in claim 1, wherein the following conditional expression is further satisfied:

$$Nd3 < 1.7 \qquad (1\text{-}1),$$ where

Nd3 is a refractive index of the material of the third lens for d-line.

14. The imaging lens, as defined in claim 1, wherein the following conditional expression is further satisfied:

$$1.55 < Nd3 < 1.7 \qquad (1\text{-}3),$$ where

Nd3 is a refractive index of the material of the third lens for d-line.

15. The imaging lens, as defined in claim 1, wherein the following conditional expression is further satisfied:

$$vd3 < 26 \qquad (2\text{-}1),$$ where vd3 is an Abbe number of the material of the third lens for d-line.

16. The imaging lens, as defined in claim 1, wherein the following conditional expression is further satisfied:

$$19 < vd3 < 26 \qquad (2\text{-}2),$$ where vd3 is an Abbe number of the material of the third lens for d-line.

17. The imaging lens, as defined in claim 1, wherein the following conditional expression is further satisfied:

$$0.02 \leq (R3+R4)/(R3-R4) < 1.0 \qquad (4\text{-}5),$$ where

R3 is a curvature radius of an object-side surface of the second lens, and

R4 is a curvature radius of an image-side surface of the second lens.

18. The imaging lens, as defined in claim 1, wherein the following conditional expression is further satisfied:

$$1.0 < f12/f < 1.48 \qquad (5\text{-}4),$$ where f12 is a combined focal length of the first lens and the second lens, and f is a focal length of an entire system.

19. The imaging lens, as defined in claim 2, wherein the following conditional expression is further satisfied:

$$1.2 < R1/f < 5 \qquad (6\text{-}4),$$ where

R1 is a curvature radius of an object-side surface of the first lens, and f is a focal length of an entire system.

20. An imaging apparatus comprising:

imaging lens, as defined in claim 1, which is mounted thereon.

\* \* \* \* \*